US012089518B2

United States Patent
Bassett

(10) Patent No.: US 12,089,518 B2
(45) Date of Patent: Sep. 17, 2024

(54) SEED FIRMING DEVICE FOR IMPROVING SEED TO SOIL CONTACT IN A PLANTER FURROW WITH FEATURE DESIGNED TO PREVENT THE BUILDUP OF SOIL ON THE OUTER SURFACES BY DISCHARGING PRESSURIZED FLUID

(71) Applicant: Dawn Equipment Company, Sycamore, IL (US)

(72) Inventor: Joseph D. Bassett, Sycamore, IL (US)

(73) Assignee: DAWN EQUIPMENT COMPANY, INC., Sycamore, IL (US)

( * ) Notice: Subject to any disclaimer, the term of this patent is extended or adjusted under 35 U.S.C. 154(b) by 154 days.

(21) Appl. No.: 17/238,913

(22) Filed: Apr. 23, 2021

(65) Prior Publication Data

US 2021/0315149 A1    Oct. 14, 2021

Related U.S. Application Data

(60) Division of application No. 16/159,254, filed on Oct. 12, 2018, now Pat. No. 11,006,563, which is a
(Continued)

(51) Int. Cl.
*A01B 63/32* (2006.01)
*A01C 5/06* (2006.01)
(Continued)

(52) U.S. Cl.
CPC ............ *A01B 63/32* (2013.01); *A01C 5/066* (2013.01); *A01C 5/068* (2013.01); *A01C 7/06* (2013.01); *A01C 7/205* (2013.01)

(58) Field of Classification Search
CPC ......... A01B 63/32; A01B 63/24; A01B 63/14; A01B 63/00; A01C 5/068; A01C 7/06;
(Continued)

(56) References Cited

U.S. PATENT DOCUMENTS

| 114,002 A | 4/1871 | Godfrey |
| 123,966 A | 2/1872 | Wing |

(Continued)

FOREIGN PATENT DOCUMENTS

| BE | 551372 | 10/1956 |
| CA | 530673 | 9/1956 |

(Continued)

OTHER PUBLICATIONS

Case Corporation Brochure, Planters 900 Series Units/Modules Product Information Aug. 1986 (4 pages).
(Continued)

*Primary Examiner* — Christopher J. Novosad
(74) *Attorney, Agent, or Firm* — Justin D. Swindells; Ice Miller LLP

(57) ABSTRACT

A system for controlling the depth of at least one closing wheel in an agricultural row unit for planting seeds in a furrow. The row unit includes a firming device that passes the seeds into the soil at the bottom of the furrow, and at least one closing wheel that is pressed into a side of the furrow to close the furrow over the seeds. A control system senses the depth of the closing wheels in the furrow relative to the depth of the firming device, and adjusts the downward pressure on the closing wheel, based on changes in the sensed depth of the closing wheel, to compensate for changes in the hardness of the soil. The up and down movement of the firming device can be adjusted independently of the movement of the closing wheel. The firming device can include multiple holes through which pressurized air is forced to dislodge any dirt or mud that accumulates on the soil-engaging parts of the firming device, and can be made according to an additive manufacturing process that allows narrow channels to be formed internal to the firming device.

21 Claims, 24 Drawing Sheets

Related U.S. Application Data continuation-in-part of application No. 15/586,799, filed on May 4, 2017, now Pat. No. 10,645,865.

(60) Provisional application No. 62/648,183, filed on Mar. 26, 2018.

(51) Int. Cl.
*A01C 7/06* (2006.01)
*A01C 7/20* (2006.01)

(58) Field of Classification Search
CPC .. A01C 5/066; A01C 5/06; A01C 5/00; A01C 7/00; A01C 7/205; A01C 7/201; A01C 7/20
See application file for complete search history.

(56) References Cited

U.S. PATENT DOCUMENTS

| | | |
|---|---|---|
| 321,906 A | 7/1885 | Mcormick |
| 353,491 A | 11/1886 | Hepworth |
| 523,508 A | 7/1894 | Bauer |
| 736,369 A | 8/1903 | Dynes |
| 803,088 A | 10/1905 | Barker |
| 1,069,264 A | 8/1913 | Keller |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casady |
| 1,321,040 A | 11/1919 | Hoffman |
| 1,391,593 A | 9/1921 | Claude |
| 1,398,668 A | 11/1921 | Evandor |
| 1,442,032 A | 1/1923 | Luce |
| 1,481,981 A | 1/1924 | Boye |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 1,938,132 A | 12/1933 | Broemmelsick |
| 2,014,334 A | 9/1935 | Johnson |
| 2,044,304 A | 6/1936 | James |
| 2,058,539 A | 10/1936 | Welty |
| 2,249,637 A | 7/1941 | Rietz |
| 2,269,051 A | 1/1942 | Cahoy |
| 2,285,932 A | 6/1942 | Leavitt |
| 2,298,539 A | 10/1942 | Mott |
| 2,341,143 A | 2/1944 | Herr |
| 2,505,276 A | 4/1950 | Adam |
| 2,561,763 A | 7/1951 | Waters |
| 2,593,176 A | 4/1952 | Patterson |
| 2,596,527 A | 5/1952 | Tolbert |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,860,716 A | 11/1958 | Flock |
| 2,878,633 A | 3/1959 | Mullin |
| 2,925,872 A | 2/1960 | Darnell |
| 2,960,358 A | 11/1960 | Christison |
| 3,010,744 A | 11/1961 | Hollis |
| 3,014,547 A | 12/1961 | Van |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,080,004 A | 3/1963 | McNair |
| 3,082,829 A | 3/1963 | Buddingh |
| 3,103,993 A | 9/1963 | Gies |
| 3,110,973 A | 11/1963 | Reynolds |
| 3,115,739 A | 12/1963 | Thoen |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,256,942 A | 6/1966 | Sickle |
| 3,261,150 A | 7/1966 | Fitzgerald, Sr. |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Helmut |
| 3,370,450 A | 2/1968 | Scheucher |
| 3,397,933 A | 8/1968 | Hatcher |
| 3,420,273 A | 1/1969 | Greer |
| 3,433,474 A | 3/1969 | Jean |
| 3,447,495 A | 6/1969 | Miller |
| 3,498,036 A | 3/1970 | Cowling |
| 3,500,937 A | 3/1970 | Erickson |
| 3,507,233 A | 4/1970 | Greig |
| 3,539,020 A | 11/1970 | Torsten |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,599,403 A | 8/1971 | Gantz |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,711,974 A | 1/1973 | Webb |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,906,814 A | 9/1975 | Magnussen |
| 3,939,846 A | 2/1976 | Drozhzhin |
| 3,945,532 A | 3/1976 | Marks |
| 3,970,012 A | 7/1976 | Jones, Sr. |
| 3,975,890 A | 8/1976 | Rodger |
| 3,986,464 A | 10/1976 | Uppiano |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | Van Der Lely |
| 4,063,597 A | 12/1977 | Day |
| 4,069,029 A | 1/1978 | Hudson |
| 4,096,730 A | 6/1978 | Martin |
| 4,099,576 A | 7/1978 | Jilani |
| 4,104,851 A | 8/1978 | Perry |
| 4,122,715 A | 10/1978 | Yokoyama |
| 4,129,082 A | 12/1978 | Betulius |
| 4,135,349 A | 1/1979 | Schwertner |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,161,090 A | 7/1979 | Watts, Jr. |
| 4,173,259 A | 11/1979 | Heckenkamp |
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |

(56) References Cited

U.S. PATENT DOCUMENTS

| | | |
|---|---|---|
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,233,915 A * | 11/1980 | Kordon ............... A01B 33/142 111/91 |
| 4,241,674 A | 12/1980 | Mellinger |
| 4,249,613 A | 2/1981 | Scribner |
| 4,280,419 A | 7/1981 | Fischer |
| 4,294,181 A | 10/1981 | Smith |
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | Van Der Lely |
| 4,377,979 A | 3/1983 | Peterson |
| 4,384,444 A | 5/1983 | Rossler, Jr. |
| 4,391,335 A | 7/1983 | Birkenbach |
| 4,398,608 A | 8/1983 | Boetto |
| 4,407,371 A | 10/1983 | Hohl |
| 4,407,660 A | 10/1983 | Nevens |
| 4,413,685 A | 11/1983 | Gremelspacher |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | Van Der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A | 7/1986 | Robertson |
| 4,603,746 A | 8/1986 | Swales |
| 4,604,906 A | 8/1986 | Scarpa |
| 4,619,329 A | 10/1986 | Gorbett |
| 4,630,773 A | 12/1986 | Ortlip |
| 4,643,043 A | 2/1987 | Furuta |
| 4,646,620 A | 3/1987 | Buchl |
| 4,646,850 A | 3/1987 | Brown |
| 4,648,466 A | 3/1987 | Baker |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,682,550 A | 7/1987 | Joy |
| 4,703,809 A | 11/1987 | Van Den Ende |
| 4,726,304 A | 2/1988 | Dreyer |
| RE32,644 E | 4/1988 | Brundage |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |
| 4,768,387 A | 9/1988 | Kemp |
| 4,776,404 A | 10/1988 | Rogers |
| 4,779,684 A | 10/1988 | Schultz |
| 4,785,890 A | 11/1988 | Martin |
| 4,819,738 A | 4/1989 | Fountain |
| 4,825,957 A | 5/1989 | White |
| 4,825,959 A | 5/1989 | Wilhelm |
| 4,919,211 A | 4/1990 | Cope |
| 4,920,901 A | 5/1990 | Pounds |
| 4,926,622 A | 5/1990 | McKee |
| 4,926,767 A | 5/1990 | Thomas |
| 4,930,431 A | 6/1990 | Alexander |
| 4,986,367 A | 1/1991 | Kinzenbaw |
| 4,987,841 A | 1/1991 | Rawson |
| 4,998,488 A | 3/1991 | Hansson |
| 5,015,997 A | 5/1991 | Strubbe |
| 5,022,333 A | 6/1991 | McClure |
| 5,027,525 A | 7/1991 | Haukaas |
| 5,033,397 A | 7/1991 | Colburn, Jr. |
| 5,065,632 A | 11/1991 | Reuter |
| 5,074,227 A | 12/1991 | Schwitters |
| 5,076,180 A | 12/1991 | Schneider |
| 5,092,255 A | 3/1992 | Long |
| 5,113,957 A | 5/1992 | Tamai |
| 5,129,282 A | 7/1992 | Bassett |
| 5,136,934 A | 8/1992 | Darby, Jr. |
| 5,190,112 A | 3/1993 | Johnston |
| 5,224,553 A | 7/1993 | Heintzman |
| 5,234,060 A | 8/1993 | Carter |
| 5,240,080 A | 8/1993 | Bassett |
| 5,255,617 A | 10/1993 | Williams |
| 5,269,237 A | 12/1993 | Baker |
| 5,282,389 A | 2/1994 | Faivre |
| 5,285,854 A | 2/1994 | Thacker |
| 5,333,694 A | 8/1994 | Roggenbuck |
| 5,337,832 A | 8/1994 | Bassett |
| 5,341,754 A | 8/1994 | Winterton |
| 5,346,019 A | 9/1994 | Kinzenbaw |
| 5,346,020 A | 9/1994 | Bassett |
| 5,349,911 A | 9/1994 | Holst |
| 5,351,635 A | 10/1994 | Hulicsko |
| 5,379,847 A | 1/1995 | Snyder |
| 5,394,946 A | 3/1995 | Clifton |
| 5,398,771 A | 3/1995 | Hornung |
| 5,419,402 A | 5/1995 | Heintzman |
| 5,427,192 A | 6/1995 | Stephenson |
| 5,443,023 A | 8/1995 | Carroll |
| 5,443,125 A | 8/1995 | Clark |
| 5,461,995 A | 10/1995 | Winterton |
| 5,462,124 A | 10/1995 | Rawson |
| 5,473,999 A | 12/1995 | Rawson |
| 5,474,135 A | 12/1995 | Schlagel |
| 5,477,682 A | 12/1995 | Tobiasz |
| 5,477,792 A | 12/1995 | Bassett |
| 5,479,868 A | 1/1996 | Bassett |
| 5,479,992 A | 1/1996 | Bassett |
| 5,485,796 A | 1/1996 | Bassett |
| 5,485,886 A | 1/1996 | Bassett |
| 5,497,717 A | 3/1996 | Martin |
| 5,497,837 A | 3/1996 | Kehrney |
| 5,499,042 A | 3/1996 | Yanagawa |
| 5,499,683 A | 3/1996 | Bassett |
| 5,499,685 A | 3/1996 | Downing, Jr. |
| 5,517,932 A | 5/1996 | Ott |
| 5,524,525 A | 6/1996 | Nikkel |
| 5,531,171 A | 7/1996 | Whitesel |
| 5,542,362 A | 8/1996 | Bassett |
| 5,544,709 A | 8/1996 | Lowe |
| 5,562,165 A | 10/1996 | Janelle |
| 5,590,611 A | 1/1997 | Smith |
| 5,603,269 A | 2/1997 | Bassett |
| 5,623,997 A | 4/1997 | Rawson |
| 5,640,914 A | 6/1997 | Rawson |
| 5,657,707 A | 8/1997 | Dresher |
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,730,074 A | 3/1998 | Peter |
| 5,809,757 A | 9/1998 | McLean |
| 5,833,011 A | 11/1998 | Boertlein |
| 5,852,982 A | 12/1998 | Peter |
| 5,868,207 A | 2/1999 | Langbakk |
| 5,878,678 A | 3/1999 | Stephens |
| RE36,243 E | 7/1999 | Rawson |
| 5,953,895 A | 9/1999 | Hobbs |
| 5,970,891 A | 10/1999 | Schlagel |
| 5,970,892 A | 10/1999 | Wendling |

(56) References Cited

U.S. PATENT DOCUMENTS

| | | |
|---|---|---|
| 5,988,293 A | 11/1999 | Brueggen |
| 6,067,918 A | 5/2000 | Kirby |
| 6,068,061 A | 5/2000 | Smith |
| 6,079,340 A | 6/2000 | Flamme |
| 6,082,274 A | 7/2000 | Peter |
| 6,085,501 A | 7/2000 | Walch |
| 6,091,997 A | 7/2000 | Flamme |
| 6,145,288 A | 11/2000 | Tamian |
| 6,164,385 A | 12/2000 | Buchl |
| 6,176,334 B1 | 1/2001 | Lorenzen |
| 6,223,663 B1 | 5/2001 | Wendling |
| 6,223,828 B1 | 5/2001 | Paulson |
| 6,237,696 B1 | 5/2001 | Mayerle |
| 6,250,747 B1 | 6/2001 | Hauck |
| 6,253,692 B1 | 7/2001 | Wendling |
| 6,289,829 B1 | 9/2001 | Fish |
| 6,295,939 B1 | 10/2001 | Emms |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thompson |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,497,088 B1 | 12/2002 | Holley |
| 6,516,595 B2 | 2/2003 | Rhody |
| 6,526,735 B2 | 3/2003 | Meyer |
| 6,530,334 B2 | 3/2003 | Hagny |
| 6,575,104 B2 | 6/2003 | Brummelhuis |
| 6,622,468 B2 | 9/2003 | Lucand |
| 6,644,224 B1 | 11/2003 | Bassett |
| 6,681,868 B2 | 1/2004 | Kovach |
| 6,701,856 B1 | 3/2004 | Zoske |
| 6,701,857 B1 | 3/2004 | Jensen |
| 6,715,433 B1 | 4/2004 | Friestad |
| 6,763,773 B2 | 7/2004 | Schaffert |
| 6,786,130 B2 | 9/2004 | Steinlage |
| 6,827,029 B1 | 12/2004 | Wendte |
| 6,834,598 B2 | 12/2004 | Detlef |
| 6,840,853 B2 | 1/2005 | Foth |
| 6,843,047 B2 | 1/2005 | Hurtis |
| 6,853,937 B2 | 2/2005 | Shibusawa |
| 6,886,650 B2 | 5/2005 | Bremner |
| 6,889,943 B2 | 5/2005 | Dinh |
| 6,892,656 B2 | 5/2005 | Schneider |
| 6,907,833 B2 | 6/2005 | Thompson |
| 6,908,052 B1 | 6/2005 | Jacobson |
| 6,912,963 B2 | 7/2005 | Bassett |
| 6,923,390 B1 | 8/2005 | Barker |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,163,227 B1 | 1/2007 | Burns |
| 7,222,575 B2 | 5/2007 | Bassett |
| 7,249,448 B2 | 7/2007 | Murphy |
| 7,290,491 B2 | 11/2007 | Summach |
| 7,325,756 B1 | 2/2008 | Giorgis |
| 7,347,036 B1 | 3/2008 | Easley, Jr. |
| 7,360,494 B2 | 4/2008 | Martin |
| 7,360,495 B2 | 4/2008 | Martin |
| 7,438,006 B2 | 10/2008 | Mariman |
| 7,451,712 B2 | 11/2008 | Bassett |
| 7,497,174 B2 | 3/2009 | Sauder |
| 7,523,709 B1 | 4/2009 | Kiest |
| 7,540,245 B1 | 6/2009 | Spicer |
| 7,540,333 B2 | 6/2009 | Bettin |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,900,429 B2 | 3/2011 | Labar |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |
| 7,975,629 B1 | 7/2011 | Martin |
| 8,146,519 B2 | 4/2012 | Bassett |
| 8,151,717 B2 | 4/2012 | Bassett |
| 8,171,707 B2 | 5/2012 | Kitchel |
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,649,930 B2 | 2/2014 | Reeve |
| 8,746,661 B2 | 6/2014 | Runkel |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,581 B2 | 12/2014 | Bassett |
| 8,939,095 B2 | 1/2015 | Freed |
| 8,985,232 B2 | 3/2015 | Bassett |
| 9,003,982 B1 | 4/2015 | Elizalde |
| 9,003,983 B2 | 4/2015 | Roth |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,148,989 B2 | 10/2015 | Van Buskirk |
| 9,167,740 B2 | 10/2015 | Bassett |
| 9,192,088 B2 | 11/2015 | Bruce |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 9,392,743 B2 | 7/2016 | Camacho-Cook |
| 9,504,198 B2 | 11/2016 | Martin |
| 9,615,497 B2 | 4/2017 | Bassett |
| 9,668,398 B2 | 6/2017 | Bassett |
| 9,681,601 B2 | 6/2017 | Bassett |
| 9,723,778 B2 | 8/2017 | Bassett |
| 9,788,472 B2 | 10/2017 | Bassett |
| 9,848,522 B2 | 12/2017 | Bassett |
| 9,861,022 B2 | 1/2018 | Bassett |
| 9,980,421 B1 | 5/2018 | Hammes |
| 10,238,024 B2 | 3/2019 | Bassett |
| 10,251,324 B2 | 4/2019 | Martin |
| 10,251,333 B2 | 4/2019 | Bassett |
| 10,645,865 B2 * | 5/2020 | Bassett ................. A01C 7/205 |
| 2002/0073678 A1 | 6/2002 | Lucand |
| 2002/0162492 A1 | 11/2002 | Juptner |
| 2003/0141086 A1 | 7/2003 | Kovach |
| 2003/0141088 A1 | 7/2003 | Kovach |
| 2004/0005929 A1 | 1/2004 | Piasecki |
| 2004/0148917 A1 | 8/2004 | Eastwood |
| 2005/0000202 A1 | 1/2005 | Scordilis |
| 2005/0005704 A1 | 1/2005 | Adamchuk |
| 2005/0045080 A1 | 3/2005 | Halford |

(56) References Cited

U.S. PATENT DOCUMENTS

| | | |
|---|---|---|
| 2005/0199842 A1 | 9/2005 | Parsons |
| 2006/0102058 A1 | 5/2006 | Swanson |
| 2006/0118662 A1 | 6/2006 | Korus |
| 2006/0191695 A1 | 8/2006 | Walker |
| 2006/0213566 A1 | 9/2006 | Johnson |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2009/0133888 A1 | 5/2009 | Kovach |
| 2009/0260902 A1 | 10/2009 | Holman |
| 2010/0006309 A1 | 1/2010 | Ankenman |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0101135 A1 | 5/2011 | Korus |
| 2011/0147148 A1 | 6/2011 | Ripa |
| 2011/0239920 A1 | 10/2011 | Henry |
| 2011/0247537 A1 | 10/2011 | Freed |
| 2011/0313575 A1 | 12/2011 | Kowalchuk |
| 2012/0010782 A1 | 1/2012 | Grabow |
| 2012/0048159 A1 | 3/2012 | Adams |
| 2012/0167809 A1* | 7/2012 | Bassett .......... A01C 5/064 111/119 |
| 2012/0186216 A1 | 7/2012 | Vaske |
| 2012/0186503 A1 | 7/2012 | Sauder |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0000448 A1 | 1/2014 | Franklin, III |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0165527 A1 | 6/2014 | Oehler |
| 2014/0190712 A1 | 7/2014 | Bassett |
| 2014/0197249 A1 | 7/2014 | Roth |
| 2014/0214284 A1 | 7/2014 | Sauder |
| 2014/0224513 A1 | 8/2014 | Van Buskirk |
| 2014/0224843 A1 | 8/2014 | Rollenhagen |
| 2014/0278696 A1 | 9/2014 | Anderson |
| 2015/0199748 A1* | 7/2015 | Hammock ........ G06Q 30/0635 705/26.81 |
| 2015/0216108 A1 | 8/2015 | Roth |
| 2015/0373901 A1 | 12/2015 | Bassett |
| 2016/0066498 A1 | 3/2016 | Bassett |
| 2016/0100517 A1 | 4/2016 | Bassett |
| 2016/0128263 A1 | 5/2016 | Bassett |
| 2016/0270285 A1 | 9/2016 | Hennes |
| 2016/0309641 A1 | 10/2016 | Taunton |
| 2017/0000006 A1 | 1/2017 | Raetzman |
| 2017/0000013 A1 | 1/2017 | Raetzman |
| 2017/0034985 A1 | 2/2017 | Martin |
| 2017/0094889 A1 | 4/2017 | Garner |
| 2017/0094894 A1 | 4/2017 | Heim |
| 2017/0127614 A1 | 5/2017 | Button |
| 2017/0164548 A1 | 6/2017 | Bassett |
| 2017/0181373 A1 | 6/2017 | Bassett |
| 2017/0231145 A1 | 8/2017 | Bassett |
| 2017/0300072 A1 | 10/2017 | Bassett |
| 2017/0303467 A1 | 10/2017 | Simmons |
| 2017/0359940 A1 | 12/2017 | Bassett |
| 2018/0000001 A1 | 1/2018 | Bassett |
| 2018/0116098 A1 | 5/2018 | Bassett |
| 2018/0139885 A1 | 5/2018 | Bassett |
| 2018/0288939 A1 | 10/2018 | Bassett |
| 2018/0317380 A1 | 11/2018 | Bassett |
| 2019/0082591 A1 | 3/2019 | Bassett |

FOREIGN PATENT DOCUMENTS

| | | | |
|---|---|---|---|
| DE | 335464 | 9/1921 | |
| DE | 1108971 | 6/1961 | |
| DE | 2402411 | 7/1975 | |
| DE | 3830141 C1 | 2/1990 | |
| EP | 1143784 B1 | 10/2001 | |
| EP | 2196337 B1 | 6/2010 | |
| EP | 2497348 A1 | 9/2012 | |
| EP | 3150045 | 4/2017 | |
| GB | 1574412 | 9/1980 | |
| GB | 2056238 A | 3/1981 | |
| GB | 2160401 | 12/1985 | |
| JP | S5457726 | 5/1979 | |
| SU | 392897 | 8/1973 | |
| SU | 436778 | 7/1974 | |
| SU | 611201 | 6/1978 | |
| SU | 625648 | 9/1978 | |
| SU | 1410884 A1 | 7/1988 | |
| SU | 1466674 | 3/1989 | |
| WO | 2001/023241 A2 | 4/2001 | |
| WO | 2009145381 A1 | 12/2009 | |
| WO | WO-2009146780 A1 * | 12/2009 | ............. A01C 5/068 |
| WO | 2011161140 A1 | 12/2011 | |
| WO | 2012149367 A1 | 11/2012 | |
| WO | 2012149415 A1 | 11/2012 | |
| WO | 2012167244 A1 | 12/2012 | |
| WO | 2013025898 A1 | 2/2013 | |
| WO | 2016073964 | 5/2016 | |
| WO | 2016073966 | 5/2016 | |
| WO | WO-2016205424 A1 * | 12/2016 | ............. A01B 49/06 |

OTHER PUBLICATIONS

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "New Efficiencies in Nitrogen Application," Feb. 1991, p. 6 (1 page).

Hiniker Company, Flow & Acreage Continuous Tracking System Monitor Demonstration Manuel, date estimated as early as Feb. 1991 (7 pages).

Russnogle, John, "Sky Spy: Gulf War Technology Pinpoints Field and Yields," Top Producer, A Farm Journal Publication, Nov. 1991pp. 12-14 (4 pages).

Borgelt, Steven C., "Sensor Technologies and Control Strategies For Managing Variability," University of Missouri, Apr. 14-16, 1992 (15 pages).

Buffalo Farm Equipment Catalog on Models 4600, 4630, 4640, and 4620date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Bookletdate estimated as early as Feb. 1992 (4 pages).

Yetter Catalog, date estimated as early as Feb. 1992 (4 pages).

Exner, Rick, "Sustainable Agriculture: Practical Farmers of Iowa Reducing Weed Pressure in Ridge-Till," Iowa State University University Extension, http://www.extension.iastate.edu/Publications/SA2.pdf, Jul. 1992, Reviewed Jul. 2009, Retrieved Nov. 2, 2012 (4 pages).

Finck, Charlene, "Listen to Your Soil," Farm Journal Article, Jan. 1993pp. 14-15 (2 pages).

Acu-Grain"Combine Yield Monitor 99% Accurate? 'You Bet Your Bushels!" date estimated as early as Feb. 1993 (2 pages).

John Deere, New 4435 Hydro Row-Crop and Small-Grain Combinedate estimated as early as Feb. 1993 (8 pages).

Vansichen, R. et al."Continuous Wheat Yield Measurement On A Combine," date estimated as early as Feb. 1993 (5 pages).

(56) References Cited

OTHER PUBLICATIONS

Yetter 2010 Product Catalogdate estimated as early as Jan. 2010 (2 pages).
Yetter Cut and Move Manual, Sep. 2010 (28 pages).
John Deere, Seat Catalog, date estimated as early Sep. 2011 (19 pages).
Martin Industries, LLC Paired 13 7 Spading Closing Wheels Brochure, date estimated as early as Jun. 6, 2012pp. 18-25 (8 pages).
Vogt, Willie, "Revisiting Robotics," http://m.farmindustrynews.com/farm-equipment/revisiting-robotics, Dec. 19, 2013 (3 pages).
John Deere, New Semi-Active Sea Suspension, http://www.deere.com/en-US/parts/agparts/semiactiveseat.html, date estimated as early as Jan. 2014, retrieved Feb. 6, 2014 (2 pages).
Partial European Search Report for Application No. 18170828.0, dated Jan. 9, 2019 (15 pages).
Gason, 3 Row Vineyard Mower Brochure, http://www.fatcow.com.au/c/Gason/Three-row-vineyard-mower-a-world-firt-p23696, Jul. 2010 (1 page).
Yetter Screw Adjust Residue Manager Operator's Manual, labeled "2565-729_REV_D" and dated Sep. 2010 on p. 36, retrieved Mar. 10, 2014 from the internet, available online Jul. 13, 2011, at https://web.archive.org/web/20110713162510/http://www.yetterco.com/help/manuals/Screw_Adjust_ Residue_Manager2.pdf.
European Search Report for Application No. 18170828.0, dated May 9, 2019 (18 pages).

\* cited by examiner

SEED FIRMING DEVICE FOR IMPROVING SEED TO SOIL CONTACT IN A PLANTER FURROW WITH FEATURE DESIGNED TO PREVENT THE BUILDUP OF SOIL ON THE OUTER SURFACES BY DISCHARGING PRESSURIZED FLUID

CROSS REFERENCE TO RELATED APPLICATIONS

This application is a Divisional of U.S. patent application Ser. No. 16/159,254, filed Oct. 12, 2018, now U.S. Pat. No. 11,006,563, which claims the benefit of U.S. Provisional Application No. 62/648,183, filed Mar. 26, 2018, and this application is also a continuation-in-part of U.S. patent application Ser. No. 15/586,799, filed May 4, 2017, now U.S. Pat. No. 10,645,865, all of which are hereby incorporated by reference herein in their respective entireties.

FIELD OF THE INVENTION

The present invention relates generally to agricultural planters and, more particularly, to control systems for row units having height-adjustable furrow closing devices and a height-adjustable firming device that is used to firm the soil over seeds which have been planted by the planter.

BRIEF SUMMARY

In accordance with an embodiment, a system is also provided for controlling the depth of at least one closing wheel in an agricultural row unit for planting seeds in a furrow and including at least one closing wheel that is pressed into at least one side of the furrow to close the furrow over the seeds. The system senses the depth of the closing wheel in the furrow relative to the location of the bottom of the furrow, and adjusting the downward pressure on the closing wheel based on changes in the sensed depth of the closing wheel, to compensate for changes in the hardness of the soil.

In an embodiment, the row unit includes a firming device, such as a firming wheel or a firming blade, that presses seeds into the bottom of the furrow, and the depth of the closing wheel is determined by the difference between the elevations of the firming wheel and the closing wheel. The closing wheel and the firming device may be carried on two different arms that are mounted to pivot about a common axis for changing the elevations of the closing wheel and the firming device, and including a sensing device that produces an electrical output signal that changes according to changes in the angle between the arms. That output signal can be used by an electrical controller to produce an electrical control signal for adjusting the down pressure on the closing wheel according to the magnitude of a change in the angle between the arms. The elevation of the firming device can be controlled independently from that of the closing wheel by a mechanical linkage that is decoupled from the mechanical linkage that determines the elevations of the firming device and the closing wheel. Normally, the firming device and closing wheel move up and down together, but the firming device can be independently controlled to move up and down independently of the closing wheel.

Part or all of the firming device, which can take the form of a blade or a wheel, for example, can be made by an additive manufacturing process, such as a process that includes 3D printing. The additive manufacturing process allows channels to be incorporated into the firming device so that fluids can be conveyed from the row unit and expelled out of the soil-engaging area of the firming device. Examples of fluids include soil fertilizer in gas or liquid form or weed killer. Separate channels can be provided to force fluid such as air out of holes positioned about the soil-engaging parts of the firming device to dislodge or remove any dirt (soil) of mud that has accumulated there.

When the firming device takes on the form of a blade, the soil-engaging part is relatively narrow, resembles a finger or has a finger-like shape, and includes very small holes that exit from channels that run internally down the length of the firming device for the fertilizer fluids and the air to pass through. The seed firmer or firming device can be made using an additive manufacturing process such as 3D printing, which allows one long thin piece to be made with very small internal channels passing through the length of the part leading to openings that allow fluid passed through the channels to exit out of the firming device. Conventional molding methods would require that the firming device be made in two pieces and putting tubes between them. Advantageously, the 3D printed part can make flexible and complex internal geometries (such as taking a serpentine or snaking pathway inside the device) for the air passageway that greatly facilitates and speeds up manufacture of the firming device.

According to some aspects, a seed firming device is provided. The seed firming device has at least one opening to allow a pressurized fluid that passes internally through the seed firming device to exit an outer portion thereof, which is configured to engage soil of a furrow in which seeds are planted. The opening is positioned along an outer soil-engaging surface of the firming device to prevent a buildup of soil or mud thereon as the seed firming device is moved along a furrow.

The firming device can include a finger portion having the soil-engaging surface that engages and firms the soil of the furrow as the finger portion passes through the furrow. The firming device can include a wheel that allows fluid to exit via the at least one opening as the wheel rotates, the outer soil-engaging surface being about a periphery of the wheel. The fluid can be air. The finger portion can have a width that is narrower than the furrow.

The producing can be carried out by an additive manufacturing process. The additive manufacturing process can include an additive 3D printing processes that prints an internal channel inside the finger leading to the at least one opening to allow the fluid to pass through the internal channel and out the at least one opening.

The firming can be part of a system that includes a valve configured to detect a buildup of back pressure caused by an accumulation of soil or mud on the soil-engaging surface, thereby causing another valve to open and allow the fluid through the finger and out the at least one opening.

According to still further aspects of the present disclosure, a method is disclosed of passing a pressurized fluid through at least one internal channel formed inside a firming device as the firming device is moved along a furrow by an agricultural row unit. The method includes causing a pressurized fluid to be passed through an internal channel of the firming device as the firming device is moved along the furrow until the pressurized fluid exits an opening in a soil-engaging portion of the firming device to dislodge an accumulation of mud or dirt thereon.

The method can further include causing a second pressurized fluid to be passed through a separate internal channel of the firming device until it exits a separate opening in the firming device. The second pressurized fluid can be a fertilizer or a weed killer. The separate opening can be positioned in soil of or surrounding the furrow to inject the second pressurized fluid into the soil during movement of the agricultural row unit relative to the furrow. The pressurized fluid can be air. The soil firming device can be a wheel or can include a blade having a finger portion that engages soil of the furrow.

The method can further include manufacturing the firming device according to an additive manufacturing process that forms the internal channel in the firming device as it is being constructed. The additive manufacturing process can include a 3D printing process.

According to other aspects of the present disclosure, a method is disclosed of controlling a depth of at least one closing wheel in an agricultural row unit for planting seeds in a furrow and including at least one closing wheel that is pressed into at least one side of the furrow to close the furrow over the seeds. The method includes sensing the depth of the closing wheel in the furrow relative to the location of the bottom of the furrow, and adjusting a downward pressure on the closing wheel based on changes in the sensed depth of the closing wheel, to compensate for changes in the hardness of the soil.

The row unit can include a firming device that presses seeds into the bottom of the furrow. The depth of the closing wheel can be determined by the difference between the elevations of the firming wheel and the closing wheel. The firming device can be a firming wheel.

The row unit can include a pair of closing wheels that are pressed into opposite sides of the furrow to close the furrow over the seeds. The closing wheel and the firming device are carried on two different arms that are mounted to pivot about a common axis for changing the elevations of the closing wheel and the firming device. A sensing device can be provided that produces an electrical output signal that changes according to changes in the angle between the arms.

The row unit can include an electrical controller that receives the electrical output signal and can produce an electrical control signal for adjusting the down pressure on the closing wheel according to the magnitude of a change in the angle between the arms. The controller can produce an electrical control signal for adjusting the down pressure on the closing wheel only when the magnitude of a change in the angle between the arms exceeds a preselected dead band.

The firming device can include a blade including a finger portion having a width dimensioned to fit in the furrow. The finger portion can be configured to engage the furrow to firm soil of the furrow over the seeds after the seeds are deposited in the furrow by the agricultural row unit.

The depth of the closing wheel in the furrow relative to the location of the bottom of the furrow can be sensed by a laser sensor or an optical sensor.

The method can further include adjusting a height of the firming device relative to the furrow independently of the downward pressure applied on the closing wheel as the agricultural row unit traverses the furrow.

According to yet further aspects of the present disclosure, an agricultural row unit for planting seeds in a furrow is disclosed. The row unit includes a frame having a gauge wheel that engages the soil to control the elevation of the frame, at least one closing wheel coupled to the frame to permit vertical movement of the closing wheel relative to the frame, a hydraulic cylinder containing a pressurized hydraulic fluid for applying a down force to the closing wheel to urge the closing wheel into the soil, a source of pressurized hydraulic fluid coupled to the hydraulic cylinder via a control valve, a position sensor sensing the distance between the bottom of the furrow and the elevation of the closing wheel, and producing a signal representing the distance, and a controller receiving the signal from the position sensor, and producing a control signal to control the pressure of the hydraulic fluid in the hydraulic cylinder.

The controller can determine the relative distance between the bottom of the furrow and the elevation of the closing wheel. The controller can compare the relative distance with a target value, and produce a control signal based the results of the comparison. A seed depth control system can be linked to the controller.

DETAILED DESCRIPTION

An agricultural planter typically includes a number of individual row units, each of which includes its own row cleaner device, row-opening device and row-closing device. The down pressure is controlled separately for each row unit or each of several groups of row units, and is preferably controlled separately for one or more of the individual devices in each row unit, as described in more detail in pending U.S. patent application Ser. No. 14/146,822 filed Jan. 3, 2014, the content of which is hereby incorporated by reference herein in its entirety.

Figure 1:
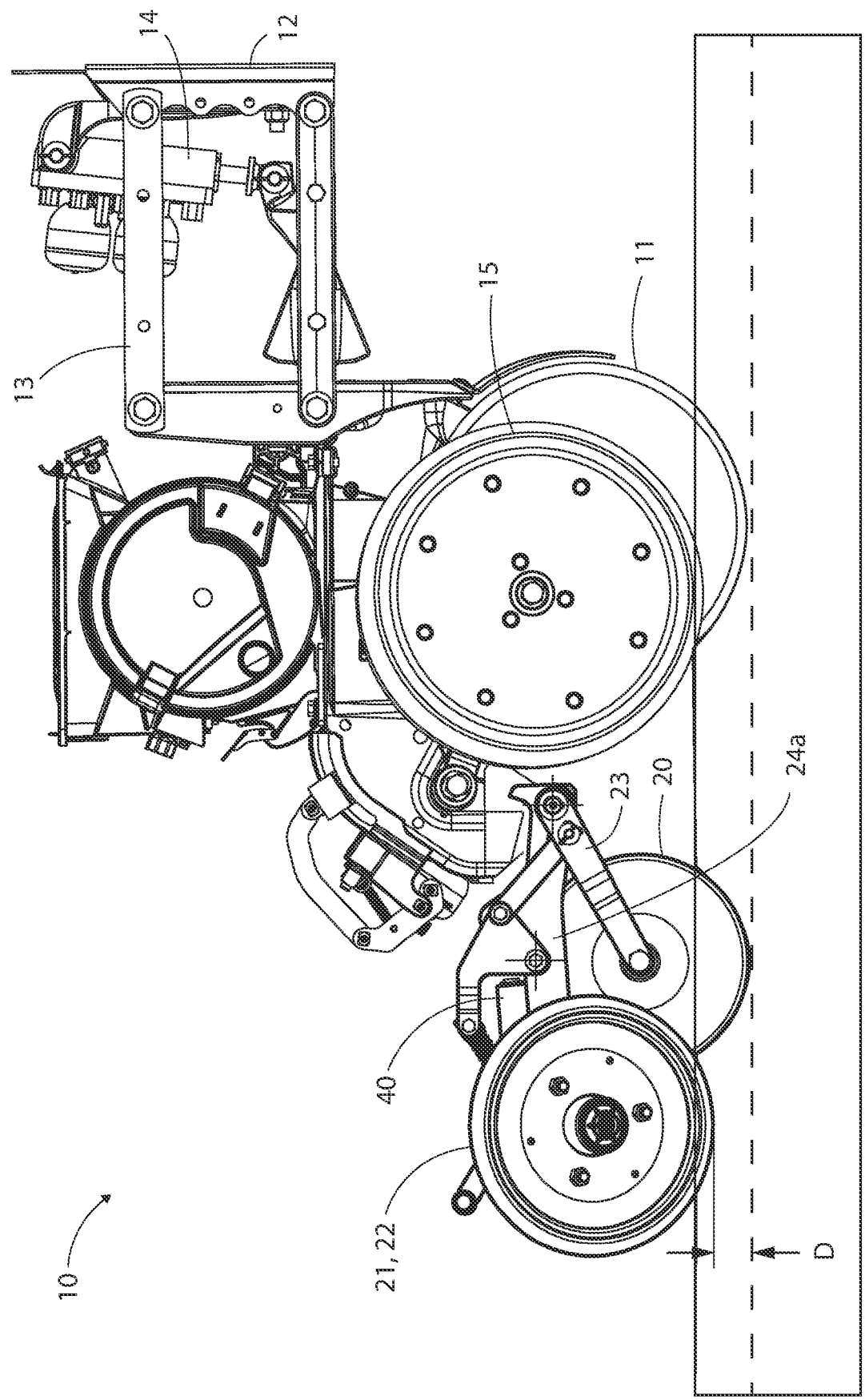
FIG. 1 is a side elevation of an agricultural planter row unit that includes a gauge wheel and an opener device.
Figure 2:
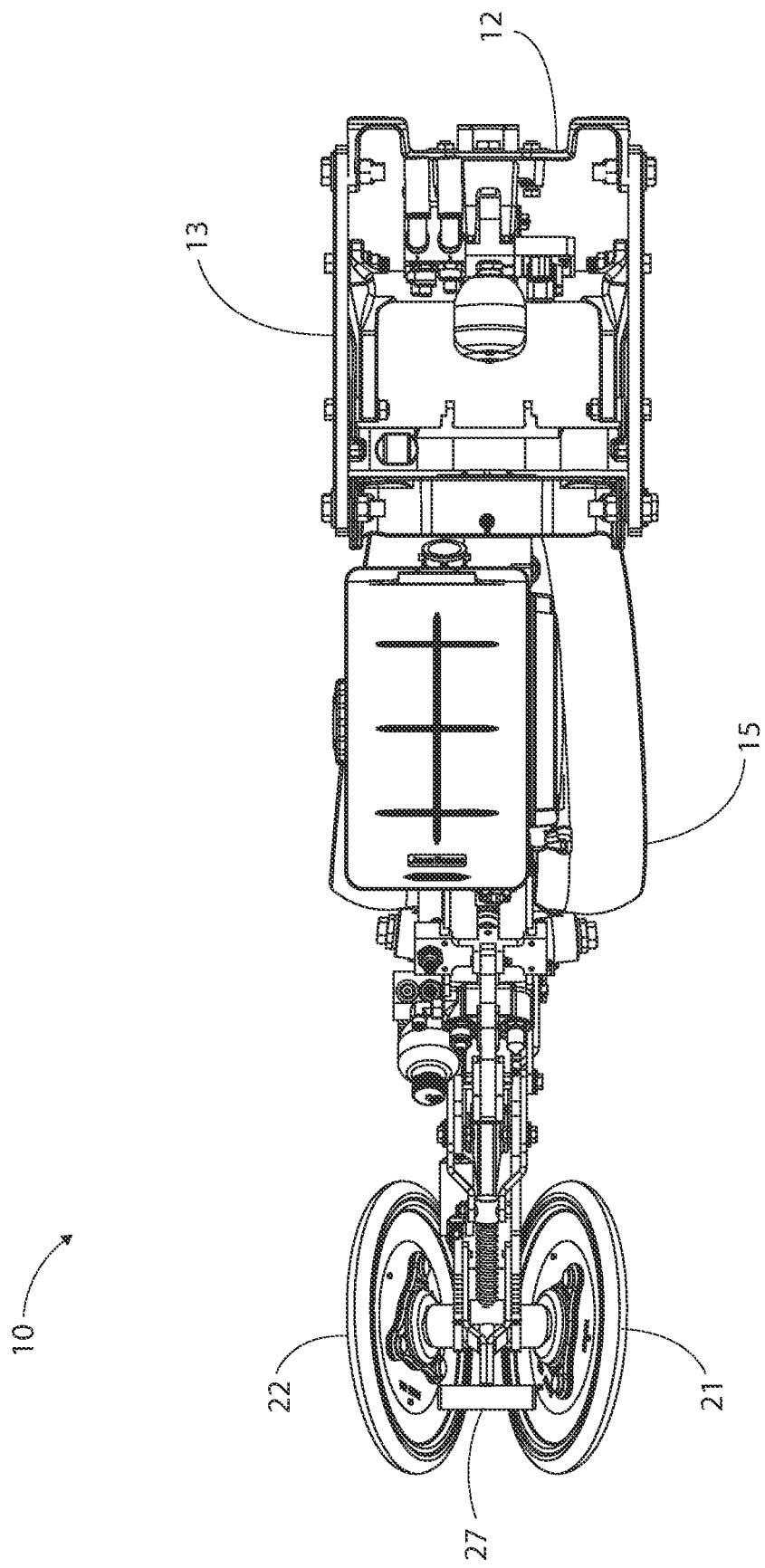
FIG. 2 is a top plan view of the planter row unit shown in FIG. 1.
Figure 3:
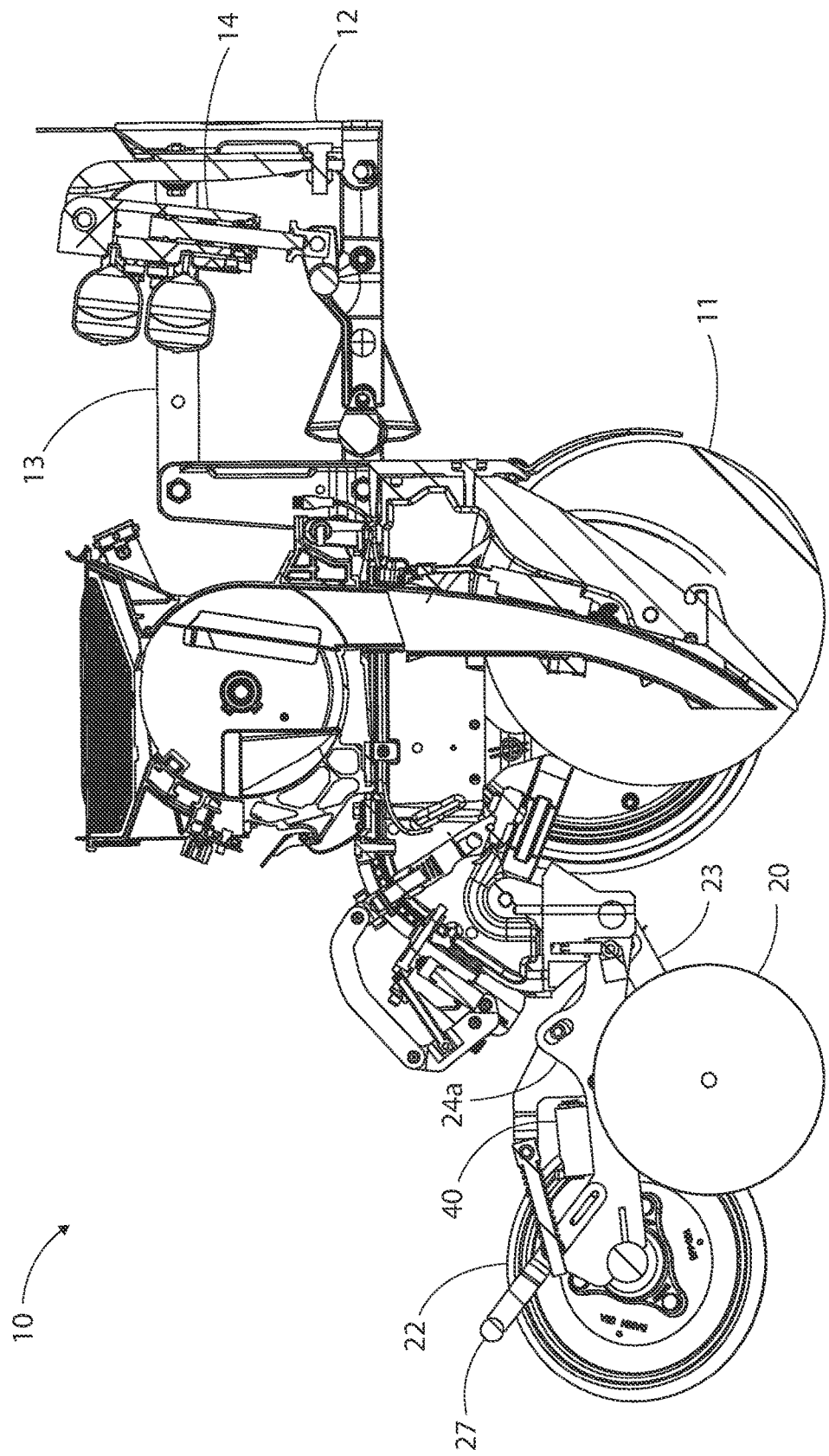
FIG. 3 is a vertical longitudinal section taken along line A-A in FIG. 2.
Figure 4:
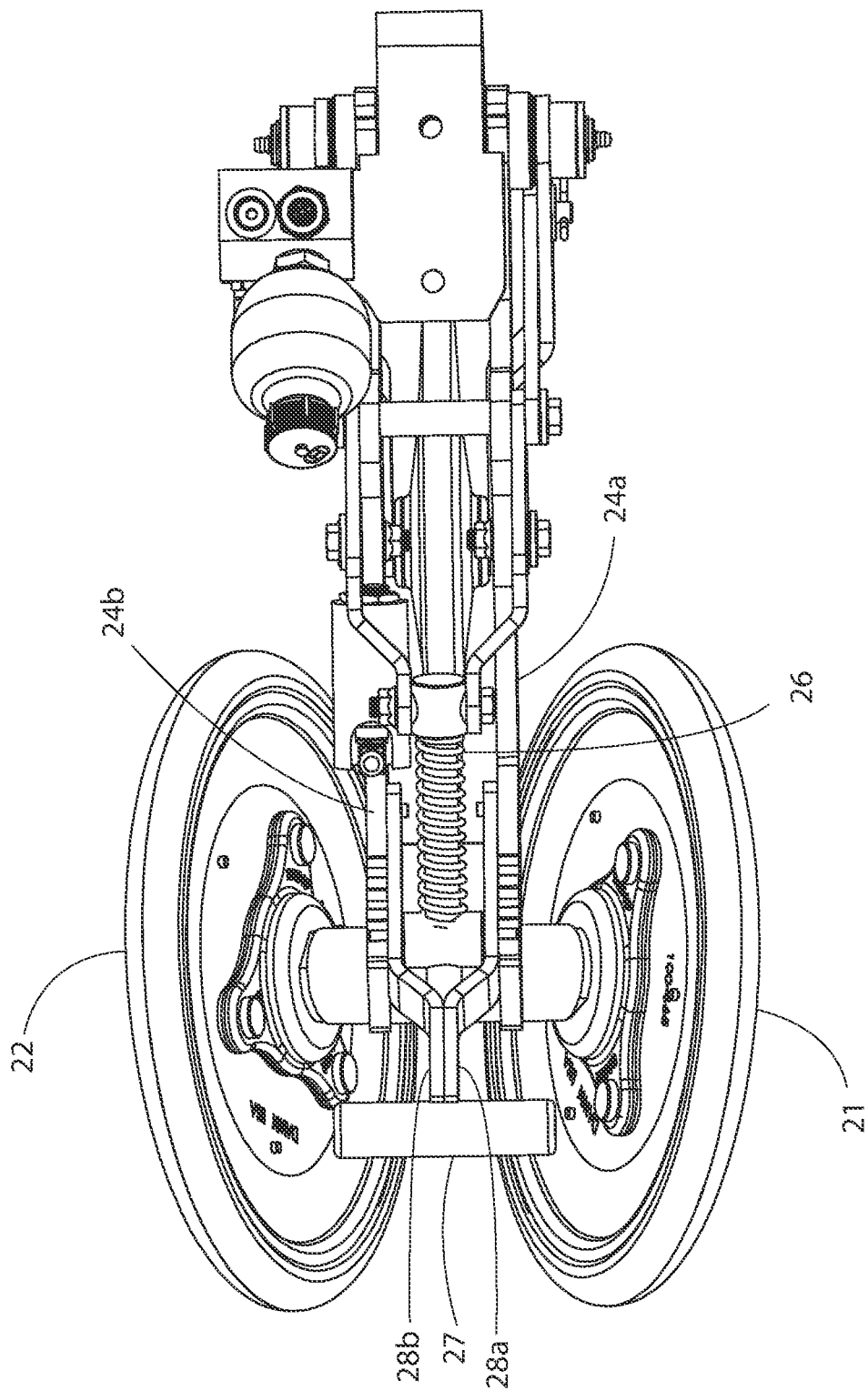
FIG. 4 is an enlargement of the left end portion of FIG. 2.
Figure 5:
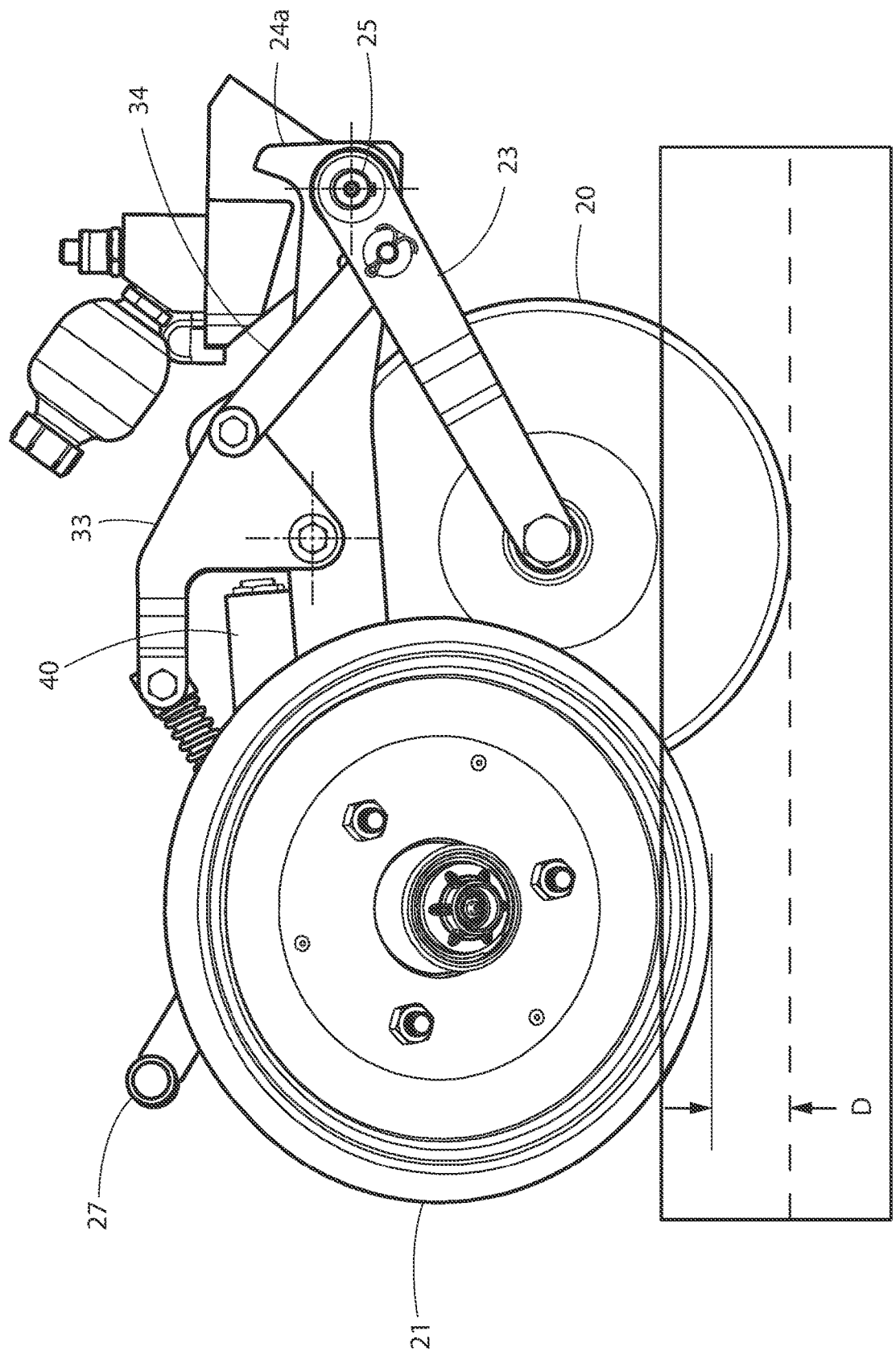
FIG. 5 is an enlargement of the left end portion of FIG. 1.
Figure 6:
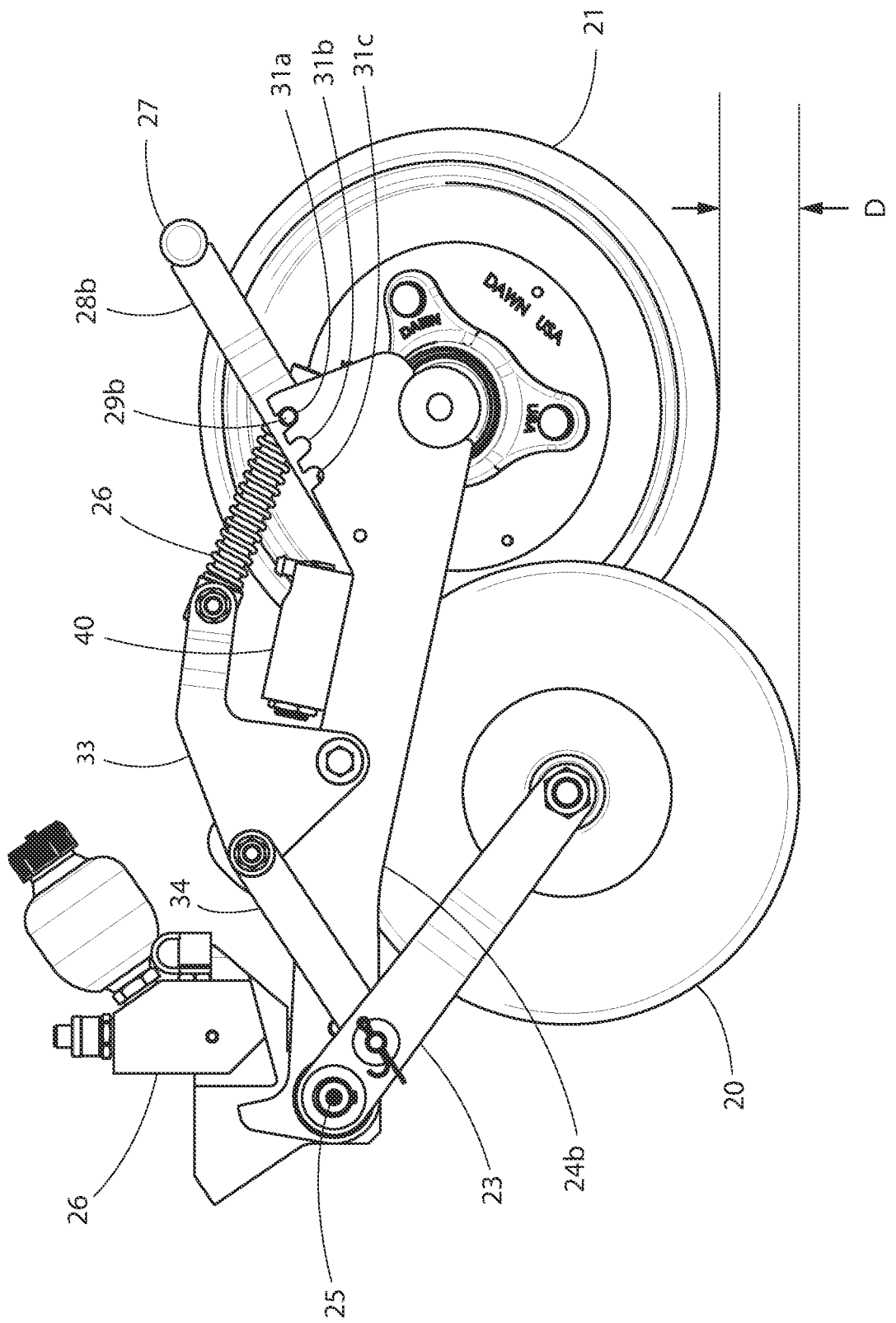
FIG. 6 is a side elevation of the structure shown in FIG. 5 with an opposite direction of motion and with one of the closing wheels removed to show the structure between the two closing wheels.
Figure 7:
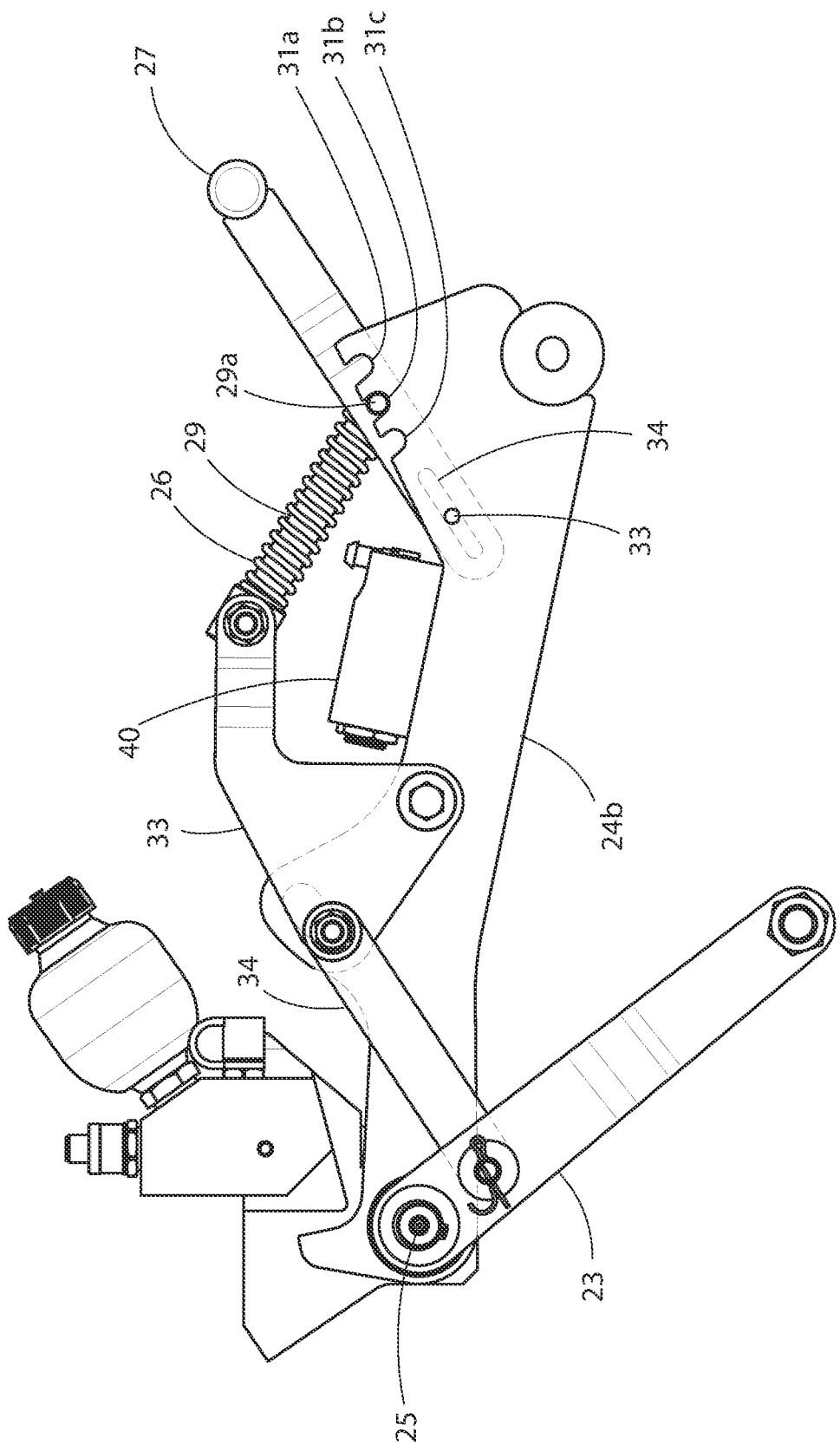
FIG. 7 is a top perspective view of the structure shown in FIG. 5 with an opposite direction of motion.
Figure 8:
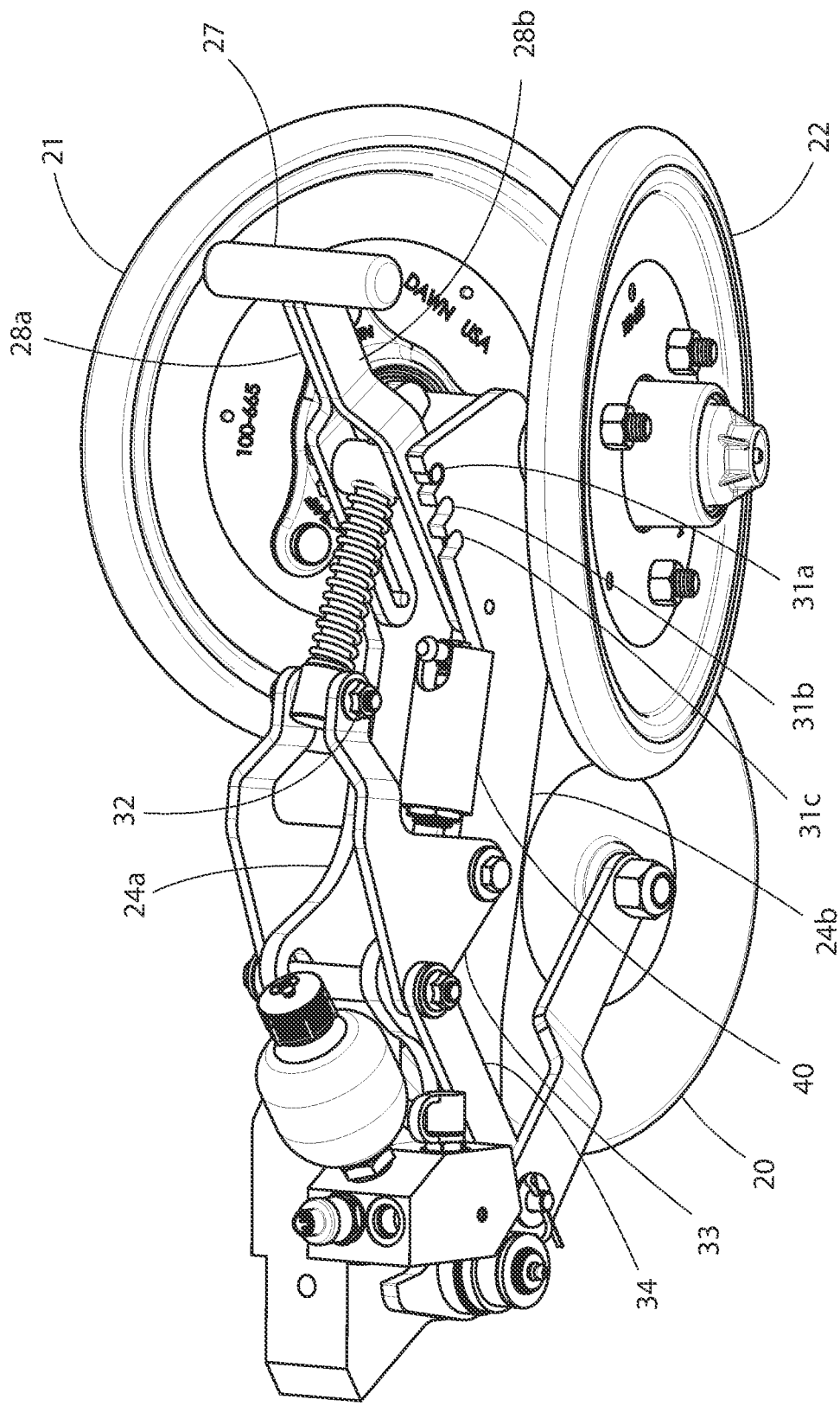
FIG. 8 is an exploded perspective view of the structure shown in FIG. 7.
Figure 9:
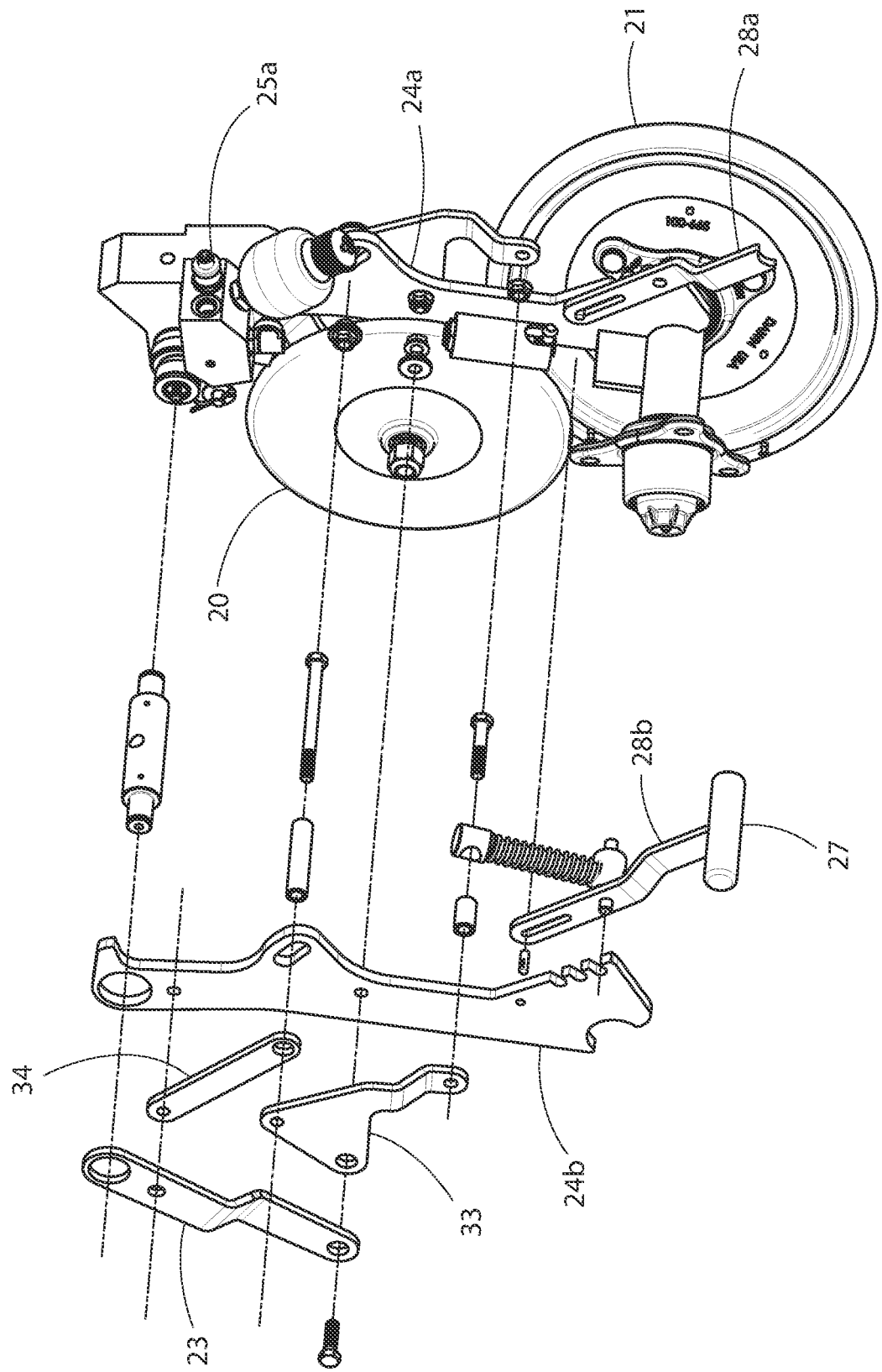
FIG. 9 is an enlarged side elevation of a portion of the structure shown in FIG. 7.

FIG. 1 illustrates a planting row unit 10 that includes a furrow-opening device 11 for the purpose of planting seed or injecting fertilizer into the soil. A conventional elongated hollow towing frame (typically hitched to a tractor by a draw bar) is rigidly attached to the front frame 12 of a conventional four-bar linkage assembly 13 that is part of the row unit 10. The four-bar (sometimes referred to as "parallel-bar") linkage assembly 13 is a conventional and well known linkage used in agricultural implements to permit the raising and lowering of tools attached thereto.

As the planting row unit 10 is advanced by a tractor, the opening device 11 penetrates the soil to form a furrow or seed slot 20 having a depth, D. A gauge wheel 15 determines the planting depth for the seed and the height of introduction of fertilizer, etc. The planting row unit 10 is urged downwardly against the soil by its own weight, and, in addition, a hydraulic cylinder 14 is coupled between the front frame 12 and the linkage assembly 13 to urge the row unit 10 downwardly with a controllable force that can be adjusted for different soil conditions. The hydraulic cylinder 14 may also be used to lift the row unit off the ground for transport by a heavier, stronger, fixed-height frame that is also used to transport large quantities of fertilizer for application via multiple row units.

A system for controlling the down pressure applied to the row unit by the hydraulic cylinder 14 is described in U.S. Pat. No. 9,232,687, the content of which is hereby incorporated by reference herein in its entirety.

Bins on the row unit carry the chemicals and seed which are directed into the soil. Other portions of the row unit 10 then deposit seed in the seed slot and fertilizer adjacent to the seed slot, and the seeds are pressed (or firmed) into the soil at the bottom of the furrow by a firming device 20, which can take the form of a blade or a wheel, for example. The term "firming" herein refers to seed firming as understood by those skilled in the agricultural farming arts. The furrow created by the furrow-opening device 11 and firmed by the optional firming device 20 is finally closed by a pair of closing wheels 21 and 22 that are pressed into opposite side walls of the furrow to distribute loosened soil into the furrow, over the seeds in the bottom of the furrow.

The firming device 20 is carried on the end of an arm 23, and the closing wheels 21 and 22 are carried by arms 24a and 24b, respectively. The arms 24a, 24b and 25 are mounted for pivoting movement about a common horizontal axis 25, and a hydraulic cylinder 25a presses the closing wheels 21, 22 downwardly with a controlled pressure. In this illustration, the firming device 20 is pressed downwardly by a spring 26 that is coupled to the firming wheel support arm 23 via links 33 and 34. The pressure applied by the spring 26 to the firming device 20 can be manually adjusted by using a handle 27 on the end of a pair of arms 28a and 28b or automatically adjusted as described in more detail below. The pin 29 fits into any of three notches 30a-30c in the top edges of the closing wheel support arms 24a and 24b.

Figure 10:
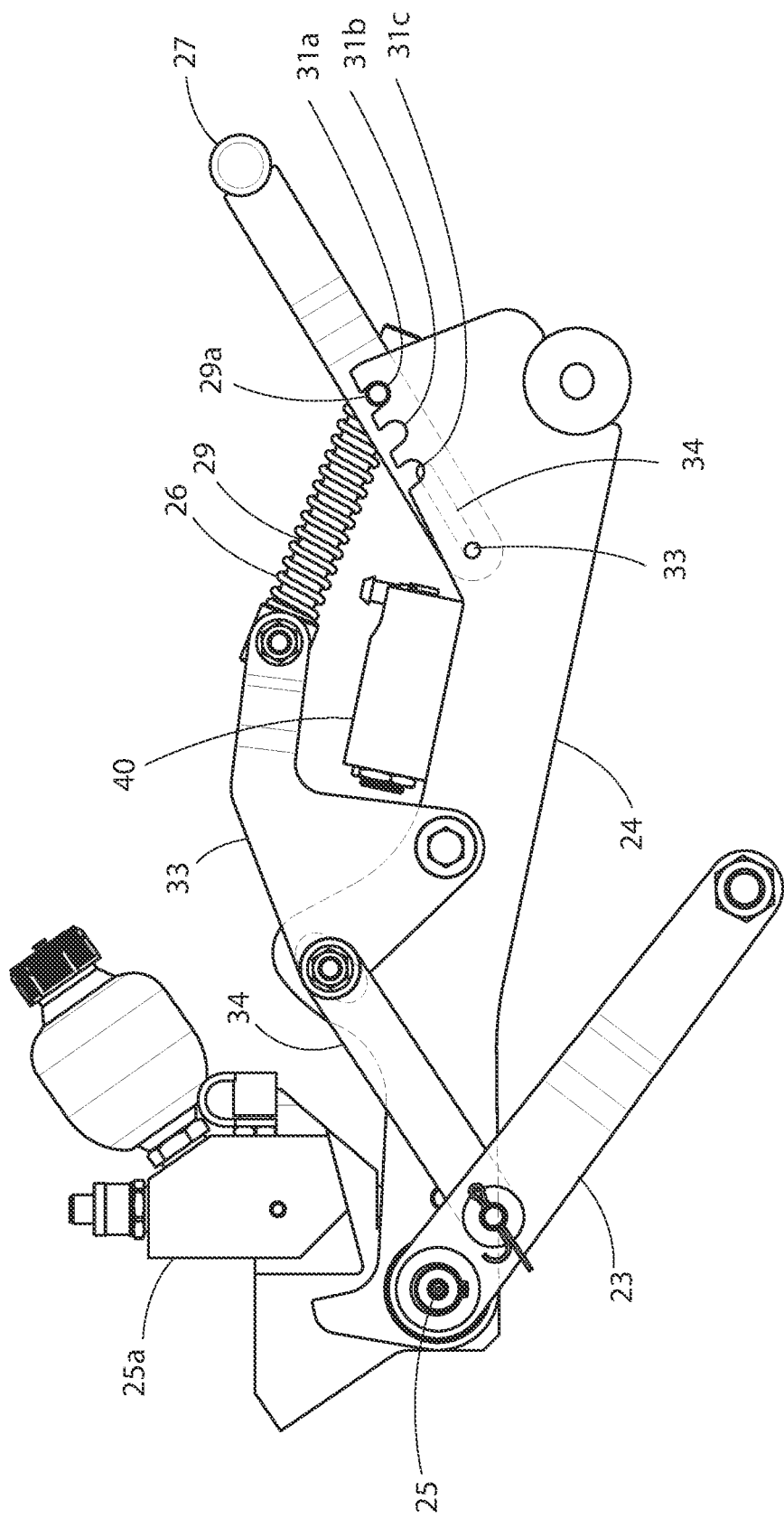
FIG. 10 is the same view shown in FIG. 9 but with the support arm for the closing wheels set in a lower position.

The spring 26 is coiled around a rod 29 that is connected to one end of the link 33 and at its other end to the arms 28a, 28b by a pin 29a that extends though mating holes in the arms 28a, 28b. The rod 29 is pivoted about an axis 31 so that the arms 28a, 28b can be manipulated to move the pin 29a in and out of the notches 31a-31c (seen in FIG. 10). The lower portions of the arms 28a, 28b form slots 34 that fit over pins on the arms 28a, 28b to permit the arms to be moved longitudinally to align the pin 29a with any one of the notches 31a-31c. The spring force applied to the firming device 20 by the spring 26 increases as the pin 29a is advanced from notch 31a to 31c because the spring 26 becomes progressively more compressed.

The depth of the firming device 20 is substantially constant because it slides on the bottom of the furrow, in front of the closing wheels 21, 22, and the furrow formed in the soil of the earth has a substantially constant depth because the cutting tool that forms the furrow has its own down pressure control system. Consequently, the depth of the closing wheels 21, 22 can be controlled by sensing the distance between the elevation of the firming device 20 and the elevation of the closing wheels 21, 22. In the illustrative example shown in the drawings, that distance is monitored by a proximity sensor 28 mounted on the arm 24. This pivoting movement of the arm 24 with changes in the elevation of the closing wheels 21, 22 changes the distance between the proximity sensor and the firming wheel arm 23. This causes the proximity sensor 28 to produce an electrical output signal that represents the depth of the closing wheels relative to that of the firming wheel. Changes in that output signal are used to change the down pressure applied to the closing wheels, as described in more detail below.

Another way to monitor the changes in the elevation of the closing wheels relative to that of the firming device 20 is to use a sensor that detects change in the angle between the arms that carry those wheels. The support arms 23 and 24 are mounted to pivot around a common axis, so that a sensor, such as a linear inductive distance sensor, can detect changes in that angle when the arm 24 rotates relative to the arm 23. The output of the sensor used to detect changes in the elevation is sent to a controller for executing an algorithm to determine whether the down pressure applied to the closing wheels should be adjusted and, if so, in which direction (e.g., up or down relative to earth).

Figure 11:
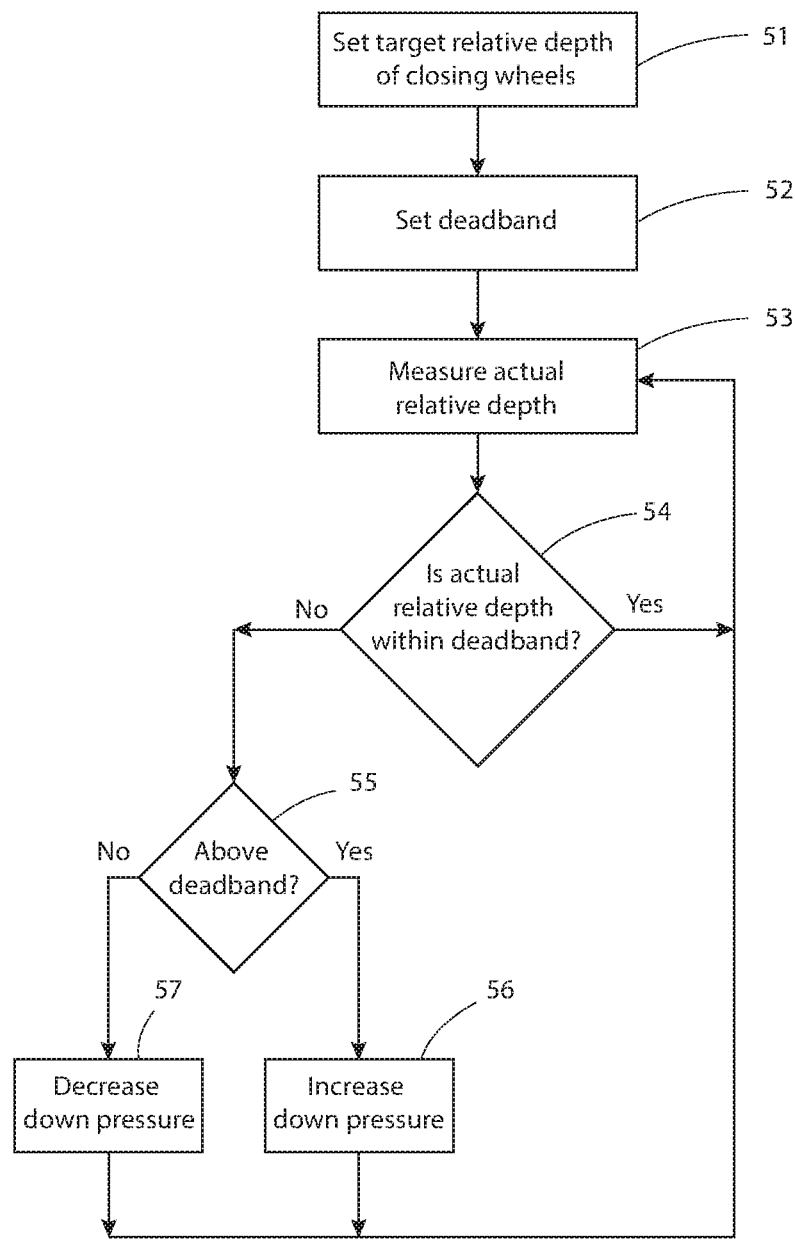
FIG. 11 is a flow chart of an algorithm that can be used by an electrical controller in the row unit of FIGS. 1-10 to control the down pressure applied to the closing wheels to control their depth.

FIG. 11 is a flow chart of an exemplary software or firmware algorithm that can be executed by a controller or computer to determine whether the down pressure applied to the closing wheels should be adjusted and, if so, in which direction (e.g., up or down, relative to earth). Step 51 of the algorithm sets a target value for the distance D between the elevation of the firming wheel and the elevation of the closing wheels, and step 52 sets a deadband on both sides of the target value in which deviations from the target value are not large enough to warrant a change in the down pressure applied to the closing wheels. Step 53 measures the signal from the sensor 40, which is proportional to the actual distance D between the current depth of the closing wheels and the constant depth of the firming wheel. This signal represents the actual "relative depth" of the closing wheels. Step 54 determines whether any change from the previous measurement is within the deadband set at step 52. If the answer at step 54 is "yes," the algorithm loops back to repeat step 53 for the next value of the signal from the sensor 40. If the answer at step 554 is "no," then step 55 determines whether the actual value is above the deadband. If the answer is "yes," the down pressure applied to the closing wheels is increased at step 57 before looping back to repeat step 53. If the answer at step 55 is "no," the down pressure applied to the closing wheels is decreased at step 57 before looping back to repeat step 53.

The adjustments made in the pressure applied to the closing wheels maintain the distance D between the depth of the firming wheel and the depth of the closing wheels within a narrow range regardless of perturbations in the earth in which the furrow is formed. If the actual distance D falls outside the deadband, the down pressure on the closing wheels is increased to lower the closing wheels if the distance D is above the deadband, or decreased to raise the closing wheels if the distance D is below the deadband. The deadband avoids oscillation of the closing wheels due to repetitive small changes in the distance between the elevation of the firming wheel and the elevation of the closing wheels.

Figure 12:
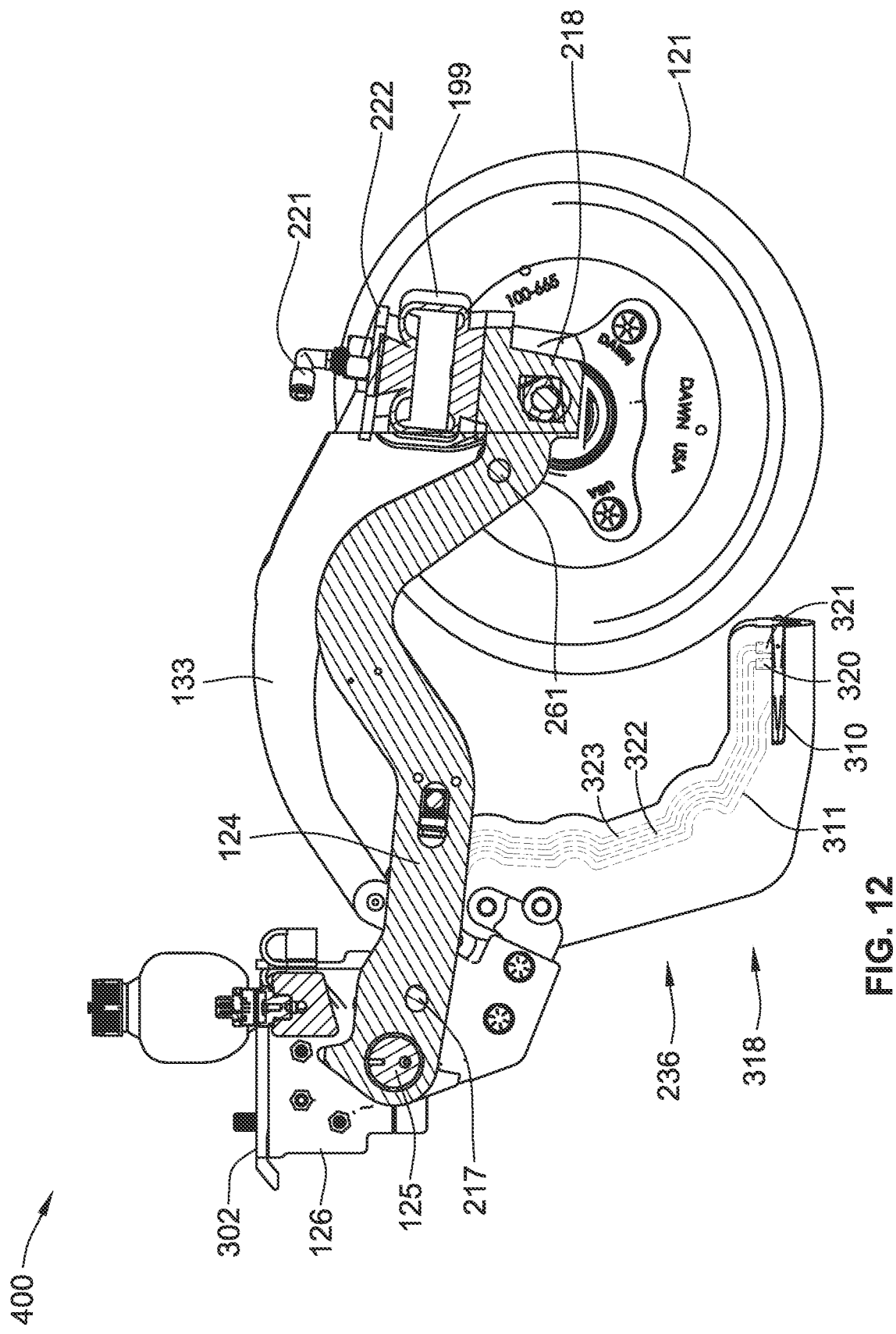
FIG. 12 is a vertical longitudinal section taken through a modified closing wheel portion of a planter row unit.

FIG. 12 is a vertical longitudinal section taken through a modified closing wheel portion of a planter row unit. A main assembly 400 includes closing wheels 120, 121 and a firming device 236, which in this illustration has the form of a blade. Note that the closing wheels 120, 121 can correspond to the closing wheels 21, 22 disclosed above, and vice versa.

Figure 13:
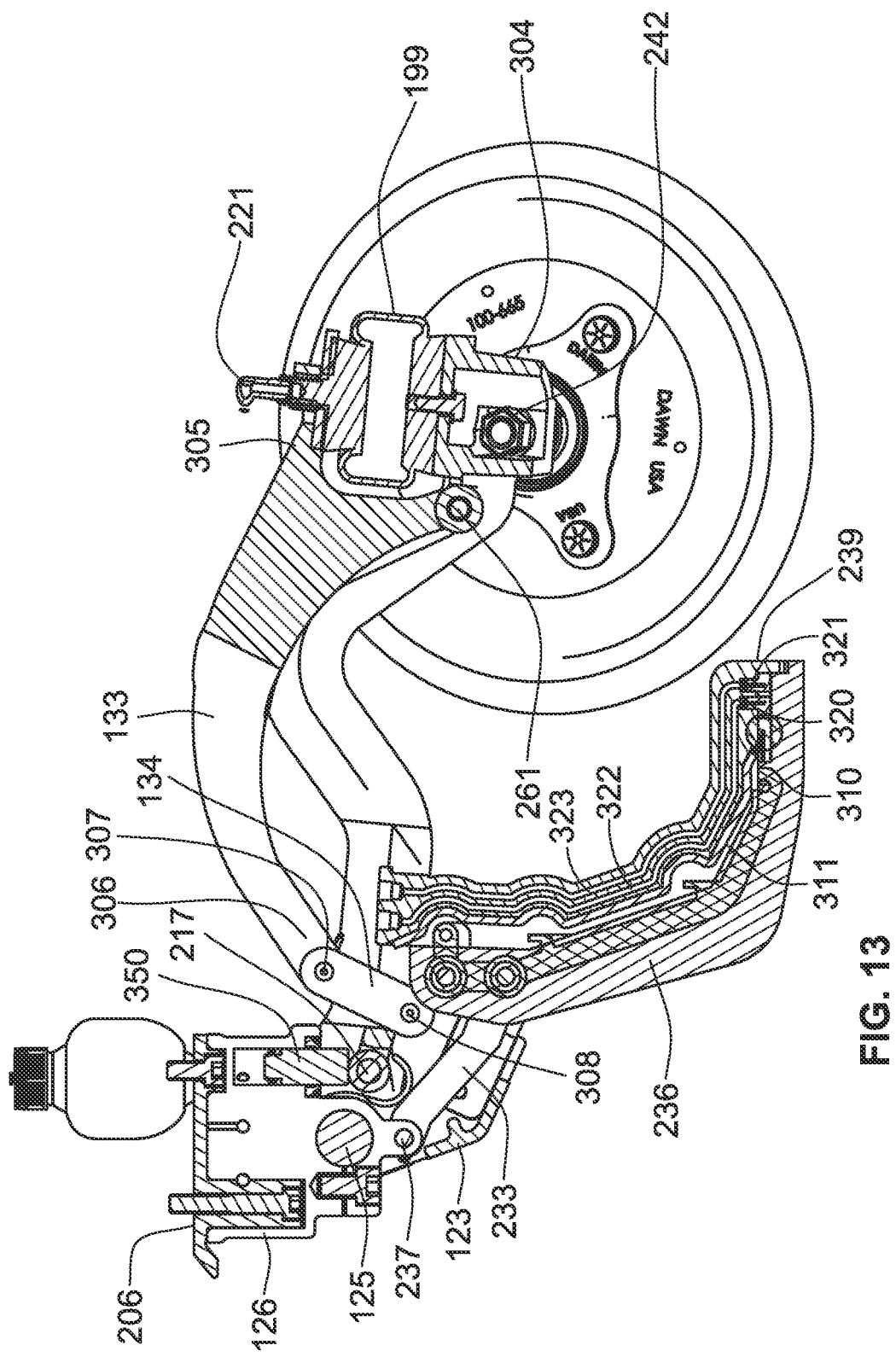
FIG. 13 is a vertical longitudinal section taken through the same apparatus shown in FIG. 12 but taken along a plane passing through the seed firming device in front of the closing wheels.
Figure 14:
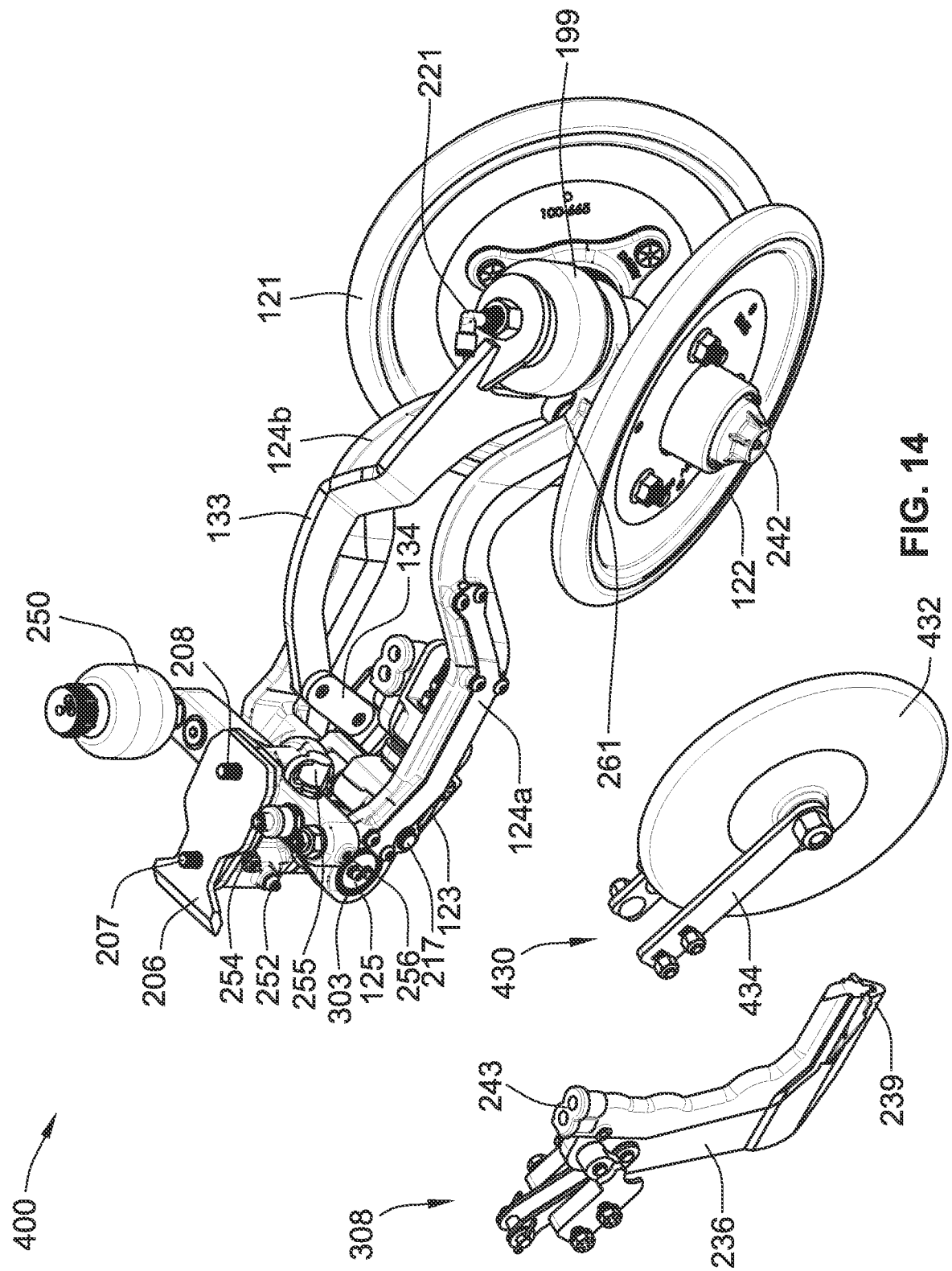
FIG. 14 is a perspective view of the apparatus shown in FIG. 13, and a schematic diagram of a fluid control system associated with that apparatus.

The main assembly 400 includes a base 126 and a mounting surface 302, which holds a main pivot pin 125, a pressure sensor 254 (FIG. 14), a fluid connector 252 (FIG. 14), a pressure regulator 250, and main downward force cylinder 350 (FIG. 13).

The wishbone arm assembly 124 has two pivot ends 303 and two middle arm sections 124*a*-124*b* and a rear base 304. The wishbone arm assembly 124 further includes a downward force pin 217 mount to the both item 303 ends of 217. The wishbone assembly 124 moves the closing wheels 120, 121 up or down relative to earth by adjusting the hydraulic pressure applied to the downward force pin 217 to cause the arm assembly 124 to rotate about the main pivot pin 125, thereby causing the closing wheels 120, 121 to ride up and down (see FIG. 15).

Figure 17:
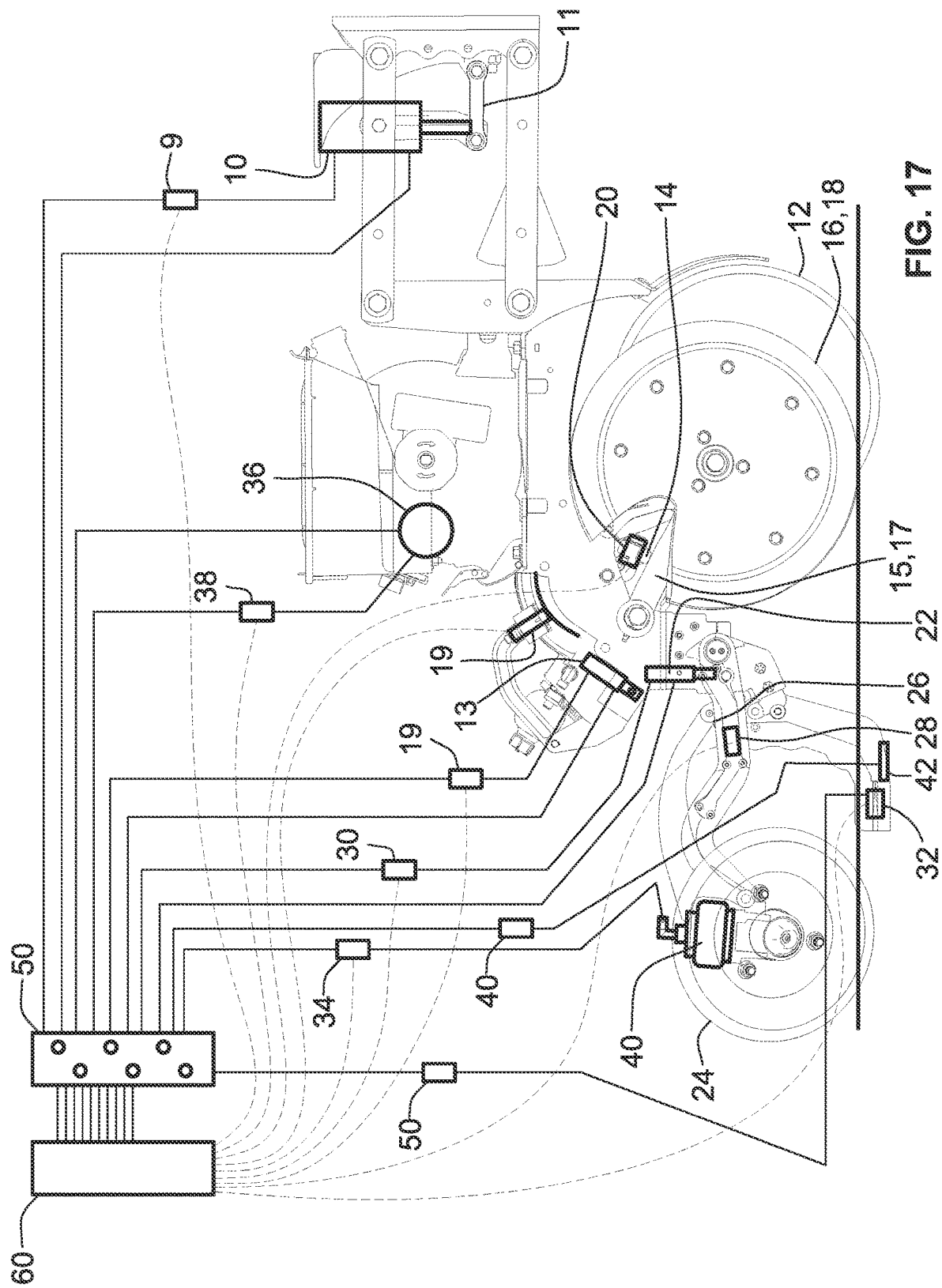
FIG. 17 is a side elevation of the row unit shown in FIGS. 1-5 with a superimposed schematic diagram of a fluid control system.
Figure 18:
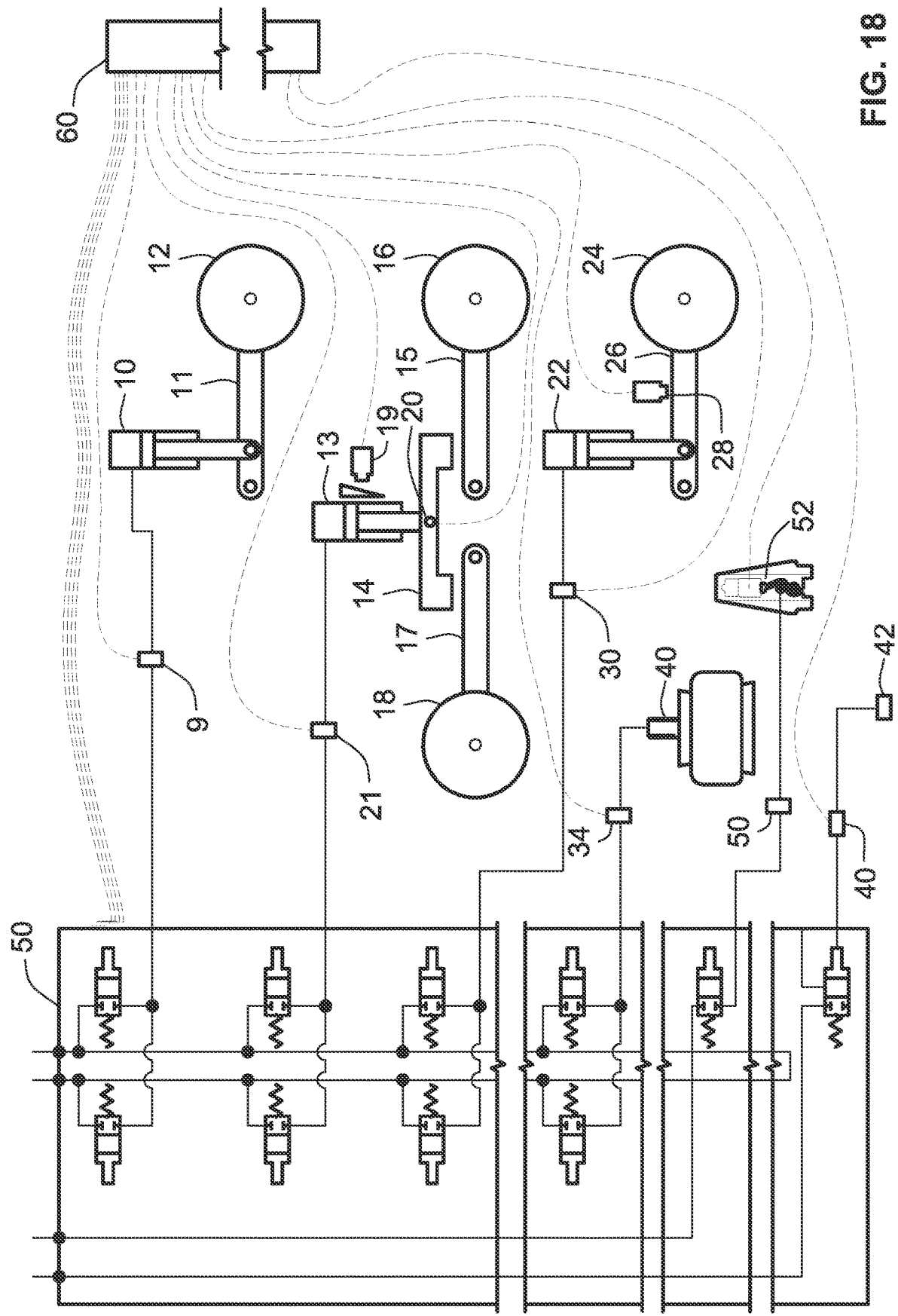
FIG. 18 is a schematic diagram of the fluid control system in the apparatus shown in FIGS. 12-17.

A secondary bladder 199 has a connector 221, and the secondary bladder 199 mounts on rear base housing 304 and to a firming device mounting end 133 of a connecting portion 305 (FIG. 13). A hose (not shown) is attached to the connector 221, to allow independent movement of the firming device mounting end 133 relative to movement of the wishbone arm assembly 124 by a controller, such as the controller 60 (FIG. 17). The linkages including a pivot arm 134 and a secondary pivot pin 261, allow for linear height adjustments of the firming device 236 up or down relative to earth, independent of up and down movements of the closing wheels 120, 121. A fluid, such as air, can be pressure-controlled through the hose (not shown) via the connector 121 into the secondary bladder 199, to fill or empty the bladder 199, thereby adjusting a height of the mounting end 133 relative to a shaft 242 (FIG. 13) of the closing wheels 120, 121. Those up and down movements on the closing wheels cause the mounting end 133 to move up and down, and that rotational motion is translated by the linkage 134 into a corresponding linear movement, to cause the firming device 236 to move up and down linearly and independently of the up and down movement of the closing wheels 120, 121.

The wishbone arm assembly 124 has three ends, the mounting end 218 (FIG. 12) which mounts to the secondary bladder 199, and another force end 306 and the pivot arm 134 which mounts to secondary pivot pin 261. The secondary pivot pin 261 is connected to the wishbone arm assembly 124 and the mounting end 133.

The linkage bar 134 (FIGS. 13 and 14) has pins 307, 308 on both ends, a first pivot pin 307 connects to the mounting end 133, and a second pivot pin 308 that connects to the front lower pivot base item 123. The front lower pivot base 133 mounts on the main pivot pin 125, which connects it to the blade 236 (FIG. 15).

Figure 15:
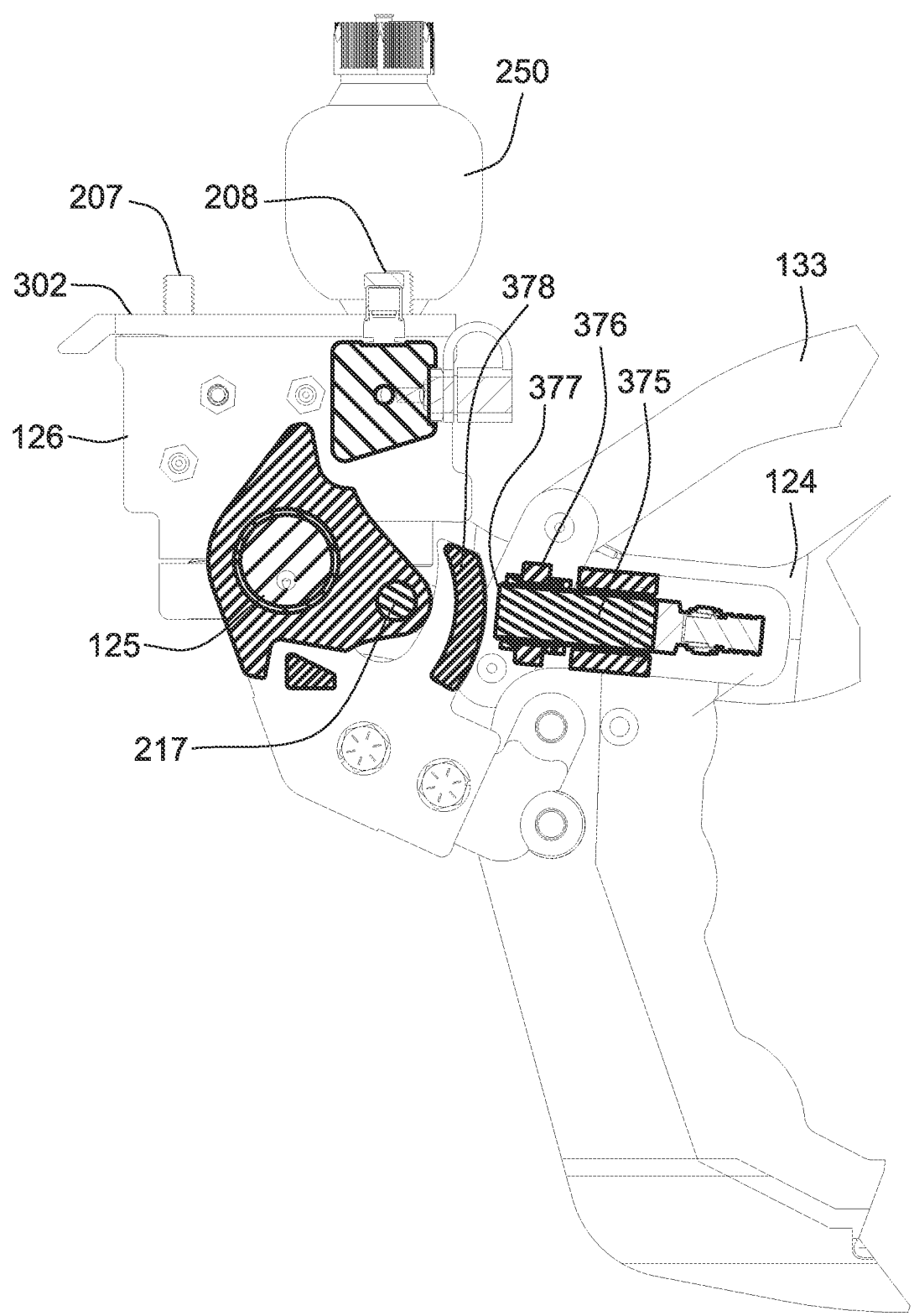
FIG. 15 is an enlarged longitudinal section taken through the leading end portion of the closing wheel portion of a planter row unit shown in FIG. 12.
Figure 16:
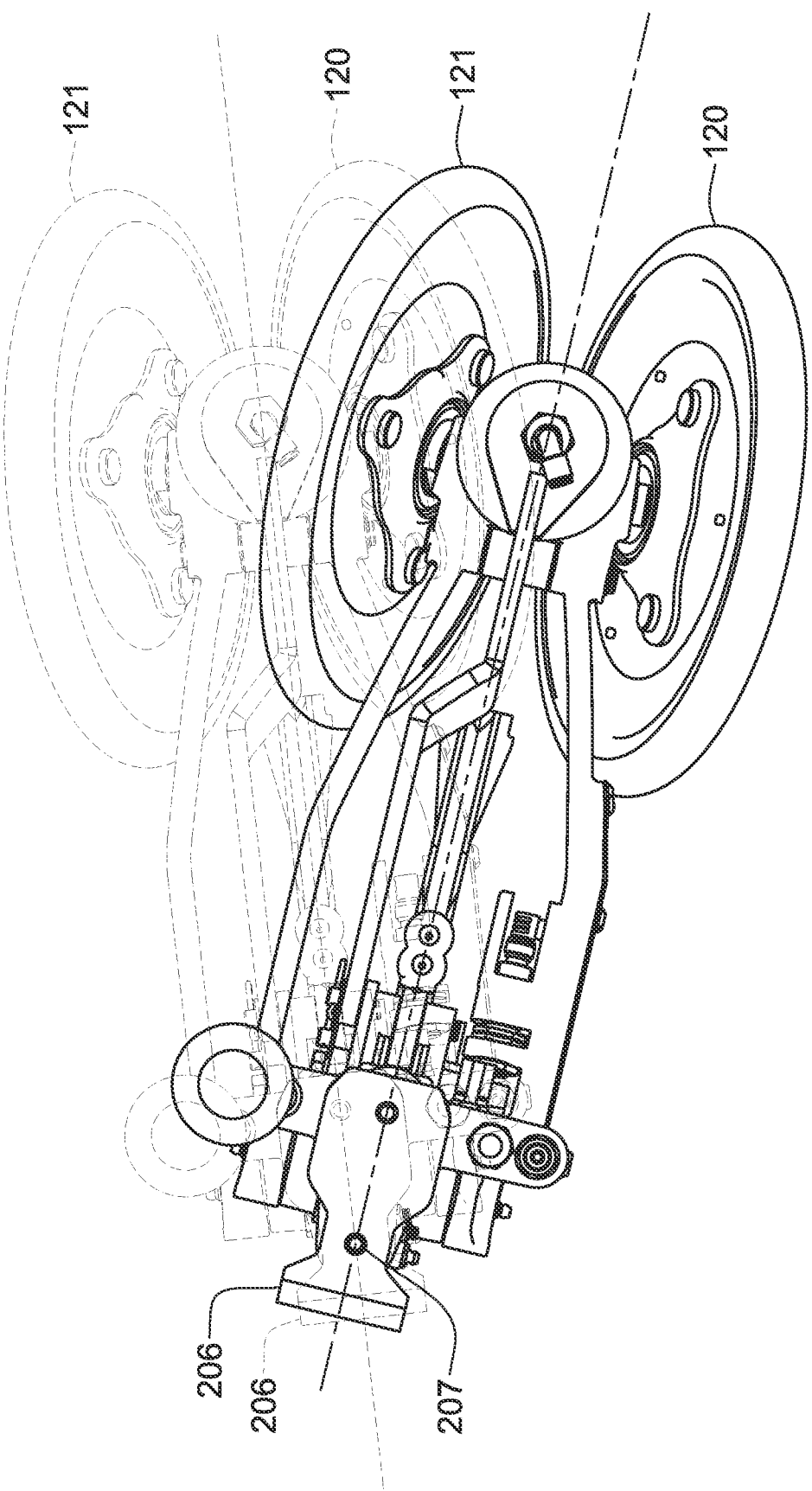
FIG. 16 is a top plan view of the apparatus shown in FIGS. 12-15, in two different angular positions around a vertical axis (207).

A first force is applied as a downward force by the cylinder 350 (FIG. 13), which applies a downward (relative to earth) force to a downward force pin 217 (FIG. 15). This downward force rotates the wishbone arm 124 downwards via the main pivot pin 125, which causes the closing wheels 120, 121 to make contact with the ground.

The secondary force applied by the cylinder 350 (FIG. 13) is added to the secondary bladder 199 upwards, which causes the mounting arm 133 to rotate around a secondary pin 261 (FIG. 12) and provides a downward force to the linkage bar 134, which provides a corresponding downward force to the front lower pivot base 123, which is attached to the blade 236 causing the blade 236 to be forced downward relative to a height of the main closing wheels 120, 121.

To keep the blade 236 parallel to the ground, the blade 236 has an angle linkage 233 (FIG. 13) mounted to a grounded pin 237 on the base 126. These linkages 233, 134 allow the blade 236 to remain parallel to the ground while undergoing linear up and down movements relative to earth. Whereas the closing wheels 120, 121 experience a slight rotational movement, which is not significant given the length of the wishbone assembly 124, the blade 236 is configured to move linearly and remain parallel to the ground over which it is traversing.

As the closing wheel 120, 121 rides up and down relative to the ground with an applied and controller-adjusted downward force, the blade 236 is forced downward into the ground relative to a height of the shaft 242 of the closing wheel 121, thereby keeping the blade at the same depth to the closing wheels 120, 121 as the closing wheels 120, 121 move up and down over the ground contour.

The arms 124*a*, 124*b* have a lateral support shaft 217 that is pushed down via the hydraulic cylinder 350 (FIG. 13), which moves the closing wheels 122, 121 down toward the ground. The air bladder 199 is inflated via the port 221 with an air pressure, which forces the mounting arm 133 down around the pivot pin 261. This action causes the mounting arm 133 to move the linkage bar 134, which in turn moves the front lower pivot base 123 and thereby the blade 236 downwards into the furrow.

This blade 236 can optionally include a furrow strain sensor 310 (FIG. 12) towards the discharge end 239 (labeled in FIG. 13). This strain sensor 310 includes a wiring harness 311 housed within the blade 236 through channels formed in the blade 236 by an additive manufacturing process such as 3D printing as discussed herein.

Also within the blade 236 are two liquid or fluid dispensers 320 and 321, each leading to one or more internal cavities or channels 322, 323 formed internal to the blade 236, which allows fluid to pass inside of the blade from the top input ports 243 (FIG. 21) without having to run any hoses or tubes externally to the blade 236, which would carry the attendant risk of getting caught or broken off. The fluid that passes through the channels 322, 323 can be air or can include a fertilizer or a weed killer, for example. The channels 322, 232 can follow a circuitous or non-straight path inside the blade 236 as shown in FIG. 12.

The blade 236 can include another internal passage or channel 300 inside of the blade 236, which discharges a fluid (such as air) out of a port 301. The channel 300 has a constant air pressure when the ports 301 are not blocked, but a rise in air pressure means that dirt (soil) or mud is building up in a front area 318 of the blade 236. Eventually, the buildup triggers a valve (such as the valve 364 shown in FIG. 21) to open up to allow a brief burst or bursts of high pressure air to flow down the passage 300 out the port 301 to dislodge the buildup of dirt or mud away from the blade 236 to relieve pressure and resistance on the blade 236 as it move across the ground furrow.

A controller 60 (shown in FIG. 17) controls movement of the closing wheels 120, 121 and firming devices 400, 430 disclosed herein as well as the dispensation of fluids through any of the firming devices disclosed herein. A hydraulic pump 361 draws from a hydraulic reserve 362. The controller 360 the pressure from the pressure sensor 254 and can increase or decrease pressure via pump the 361. An air port 301 (FIG. 12) connects a hose or line 402 to an air pressure sensor 364 and an air pump 363 shown in FIG. 21.

A fluid discharge 320 (FIG. 12) is fluidly connected to a channel 322 that connects to a pressure sensor 366 and to a fluid pump 365 and a fluid reserve 367. A second fluid discharge 321 has a cavity 323 that connects to pressure sensor 339 and to a fluid pump 338 and fluid reserve 370.

The secondary bladder 199 (FIG. 14) controls the height of 236 from the reference point of the wheels 120, 121. The secondary bladder 199 has an input port 221 that is connected to an air pressure sensor 372 and an air pump 371. The CPU or controller 60 (FIG. 17) receives respective output signals from the pressure sensors 254, 364, 366, 369, 372 and the rotation sensor 375.

Referring to FIG. 15, the rotational sensor 375 mounts to an arm 124a via mount area 376 and has a measuring end 377, which measures the distance from elements 378 and 377 shown in FIG. 15. As the wishbone arm 124 rotates around a main pivot pin 125, the distance changes between elements 377 and 378. Element 378 is fixed or grounded to the base 126 and does not rotate.

The base 126 has a mounting plate 206 with a pivot mounting bolt 207 and a mounting bolt 208, which allows the complete unit to pivot on a vertical axis on the bolt 207.

The main base 126 has a hydraulic passage for a hydraulic fluid to pass through it to the downward force cylinder 350 (FIG. 13). Within the hydraulic passage, there is a fluid input connection 252, a fluid pressure sensor 254, and a pressure regulator 250. An access hole can be used for mounting added an equipment port 255.

Figure 23:
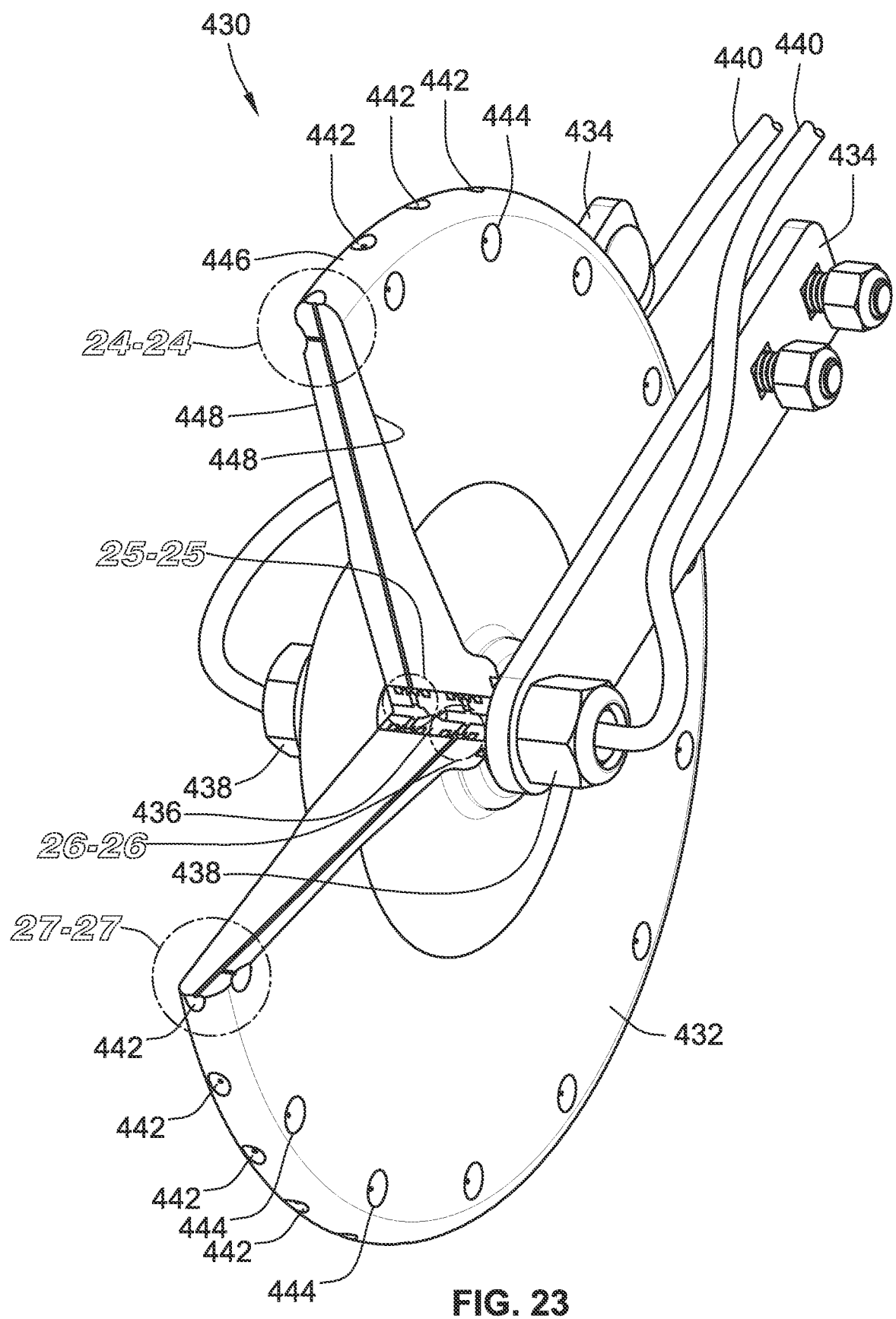
FIG. 23 is a perspective cut-away view of a portion of a wheel-type firming device having exit fluid ports about a periphery of the wheel with internal cavities to distribute fluids from a centrally installed port throughout the internal channels or cavities internal to the wheel.

The bottom mount 123 can have a blade 236 as shown or alternatively a wheel 430 (FIG. 23), either of which applies a downward pressure to the furrow and to the seeds in the furrow to "firm" them into the ground before the soil is closed over them by the closing wheels 120, 121.

Figure 21:
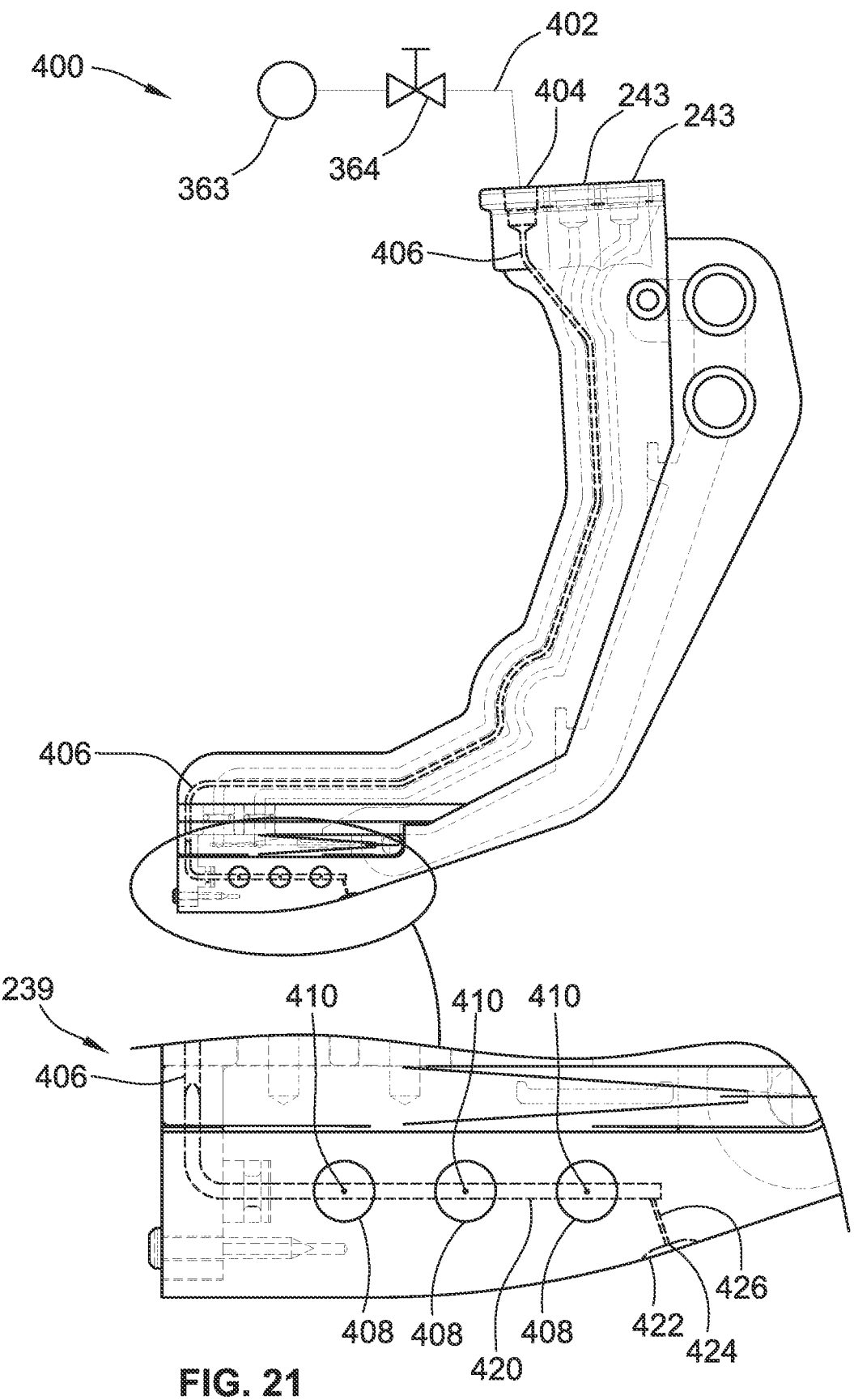
FIG. 21 is a cross-sectional view of a blade-type firming device having an enlarged section to show the fluid exit ports on a soil-engaging portion of the firming device.

The air blade 400 has a fluid/air input end 243, where there is an air pump 363 connected to a pressure valve 364, which in turn is connected to a tube or piping 402 to the air input port 404 (FIG. 21). The input port 404 is connected to a passage 406, which travels down the inside of the blade 236 down to the bottom part of the blade port 420, which is internal to the air-controlled firming blade 400 (shown in FIG. 21).

Figure 22:
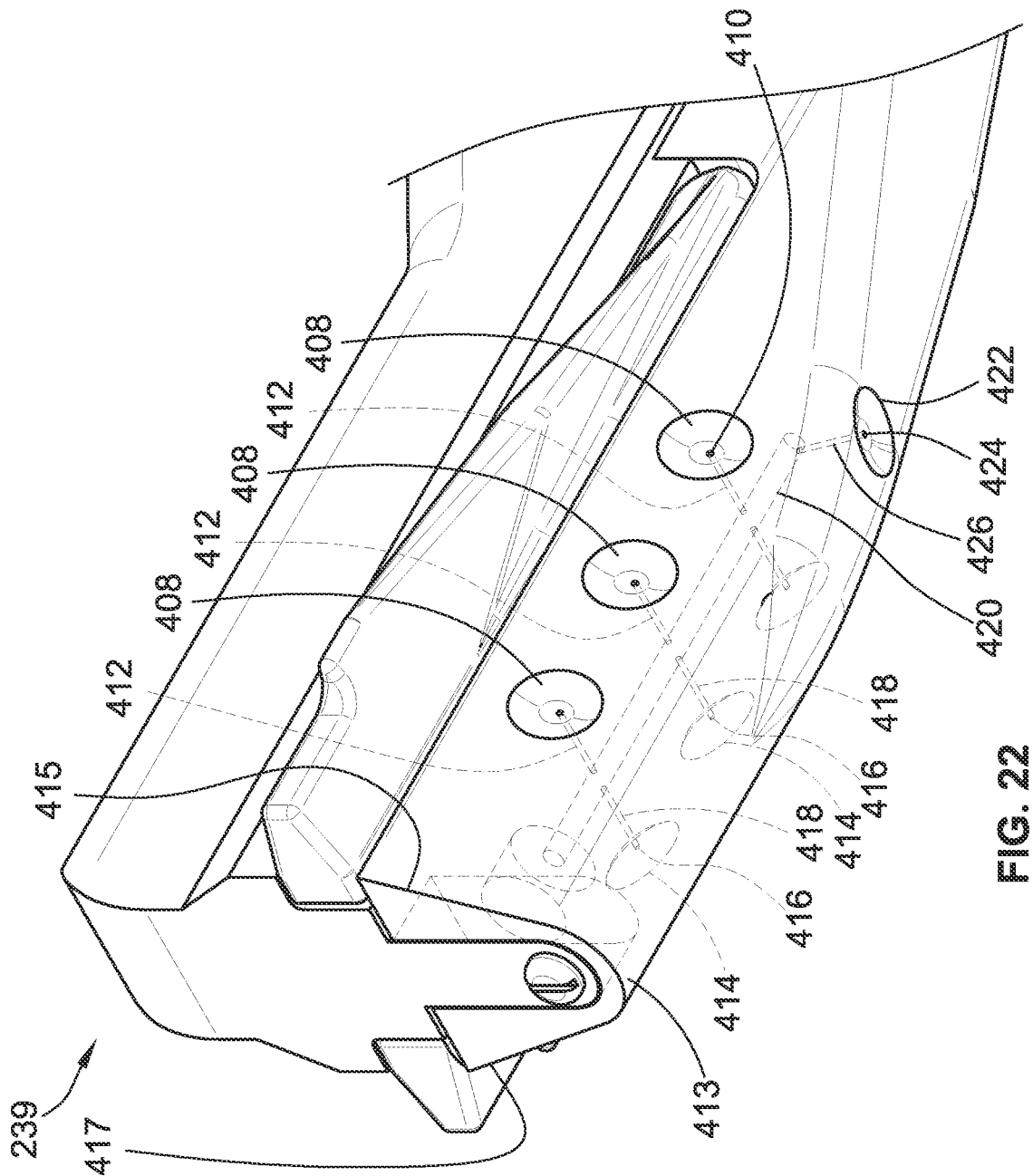
FIG. 22 is a perspective view of a bottom of the firming device shown in FIG. 21, showing the fluid exit ports in finer detail.

The blade port 420 (FIG. 21) includes smaller passages 412 and 426 (FIG. 22), which connect the blade port 420 to a conical concave relief on the side of the blade 415 or 417 (FIG. 22). These side surfaces 412 and 414 have a matting bottom/center surface 413.

There are conical concave reliefs 408 (FIG. 21) formed in the side 415 of the air blade 400 with supply passages 412, which connect to the bottom part of the blade port 420.

There are also conical concave reliefs 414 (FIG. 22) formed in the side 417 with supply passages 418 which connect to bottom part of the blade port 420.

There are also conical concave reliefs 422 (FIG. 22) formed in the bottom/center surface 413 with a supply passage 426 which connects to the bottom part of the blade port 420.

When dirt (soil) or mud starts to build or clump up inside of or around these reliefs 408, 414, 422, the accumulations start to cover up or block the air ports 410, which initially has a low pressure when the air ports are unblocked. As these reliefs 410 become plugged up, the pressure valve 364 senses an increase in pressure, and informs a controller 60 (FIG. 17) to open the pressure valve for a small amount of time to produce a blast of fluid (e.g., air) out of the ports 410, which will cause the high pressure to dislodge the dirt/mud buildup away from the side 415, 417 of the blade 400 as well as the front/bottom 413 of the blade 400, where dirt or mud is likely to accumulate and affect the soil-firming performance of the air blade 400. The terms soil and dirt are used interchangeably herein. The front or bottom 413 part of the blade 400 as presented in the illustrations can be referred to herein as a finger portion, which engages the soil of the furrow as the blade 400 is moved through the furrow by the agricultural row unit.

Instead of the blade 400 form factor to perform soil firming, a rotating wheel 430 (FIG. 23) can be used with internal cavities or channels through which pressurized fluid can pass to exit openings formed proximate or at an outer periphery of the wheel 430. The wheel 430 includes support/mounting arms 434 that attach the wheel 430 to a main body and an axle 436, which is connected with nuts 438 on either side.

Figure 24:
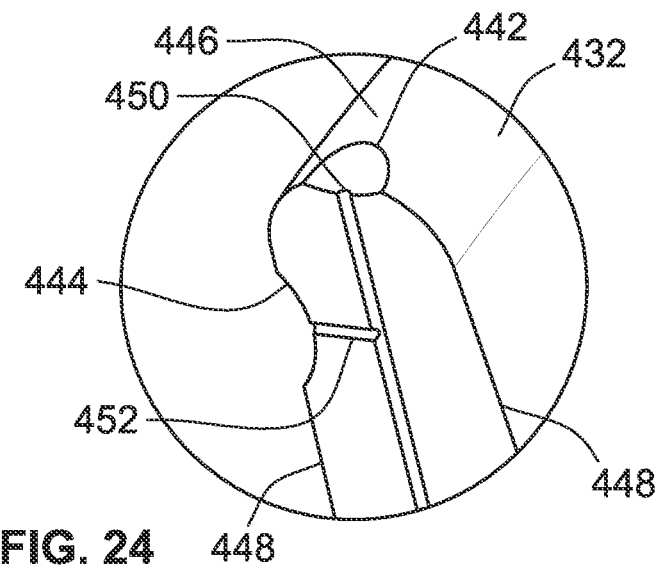
FIGS. 24, 25, 26, and 27 illustrate various cutaway views of internal channels or cavities inside the wheel-type firming device shown in FIG. 23 and ports that allow fluid connection pathways to be distributed to exit ports positioned about the periphery of the wheel.
Figure 25:
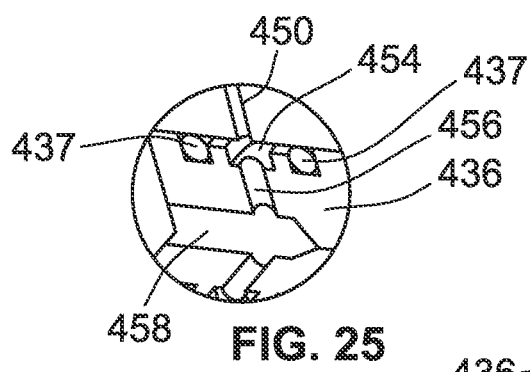
Figure 26:
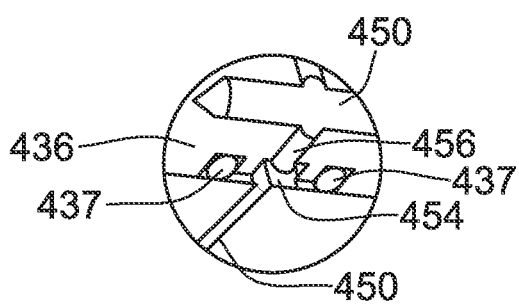
Figure 27:
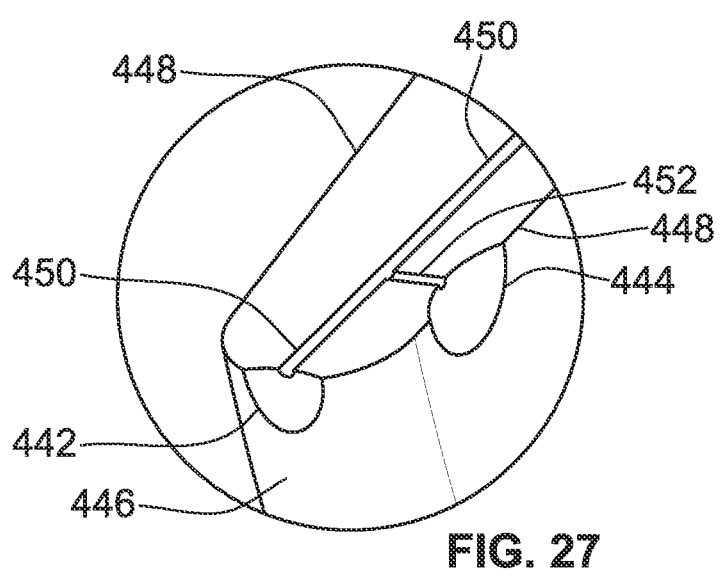

The axle 436 includes at least two ports on either side 450, 458 of the wheel 430 (FIG. 25). A port 450 (FIG. 27) has a radial passage 456 (FIG. 26) connecting to a cavity 454, which has sealing rings 437 on either side of the cavity 454. The cavity 454 feeds air to the passage 450 to conical concave reliefs on an outer edge 446 of the wheel 430 (FIG. 23) and to the side conical concave reliefs 444 via the passage 452 (FIG. 24, 27) on both sides 448 of the wheel 432. As the firming wheel 430 rotates, any dirt or mud that accumulates on the outer surface of the wheel 432 will begin to block the front and side reliefs 442, 444, raising the fluid pressure in the lines 440. The increase in fluid pressure is detected using a controller, which opens a pressure valve like the valve 364 described above to produce bursts of fluid blasted out of the reliefs 424, 444 to dislodge any dirt or mud accumulated there. As a result, dirt or mud buildup on the sides 448 and/or the bottom 446 (FIG. 24) of the wheel 432 is avoided and can be dislodged without interrupting operation of the firming wheel 430 during seed planting. The position of the relief 424 and the corresponding passage 426 at the trailing end of the blade 400 (in the direction of travel of the blade 400 as it traverses a furrow) as shown in FIG. 21 is selected to optimize the removal of dirt or mud buildup on that trailing surface. As the blade glides through the furrow, it has been found that dirt or mud can tend to accumulate in the area shown in FIG. 21 where the relief 424 is positioned, thus optimizing the removal of these contaminants from the surface of the blade 400. Likewise, the side reliefs 408 are positioned a distance above the bottom of the blade 400 at a height just below the peak of the furrow, because this is also determined to be locations of maximum buildup. Of course, the present disclosure is not limited to locating the reliefs in the precise locations shown. Depending on the form factor of the firming device, the nature of the soil, the depth of the furrow, and other or alternative considerations, more or different reliefs can be provided at different locations without departing from the scope of the present disclosure. Due to the level of air pressure required to dislodge dirt or mud, the internal passages inside the blade 400 need to be robust enough to withstand these pressures, and additive manufacturing allows these passages or channels to be formed completely internal to the blade as the blade is being manufactured or constructed. Additive manufacturing also allows the channel to take on virtually any geometry or path inside the blade, to optimize routing of the channels (e.g., in conjunction with channels for injecting fertilizer and/or weed killer or other fluids into the furrow) inside the blade without jeopardizing its structural integrity required to withstand the forces acting upon the blade as it is moved through the furrow and imparted with a downward pressure.

Figure 19:
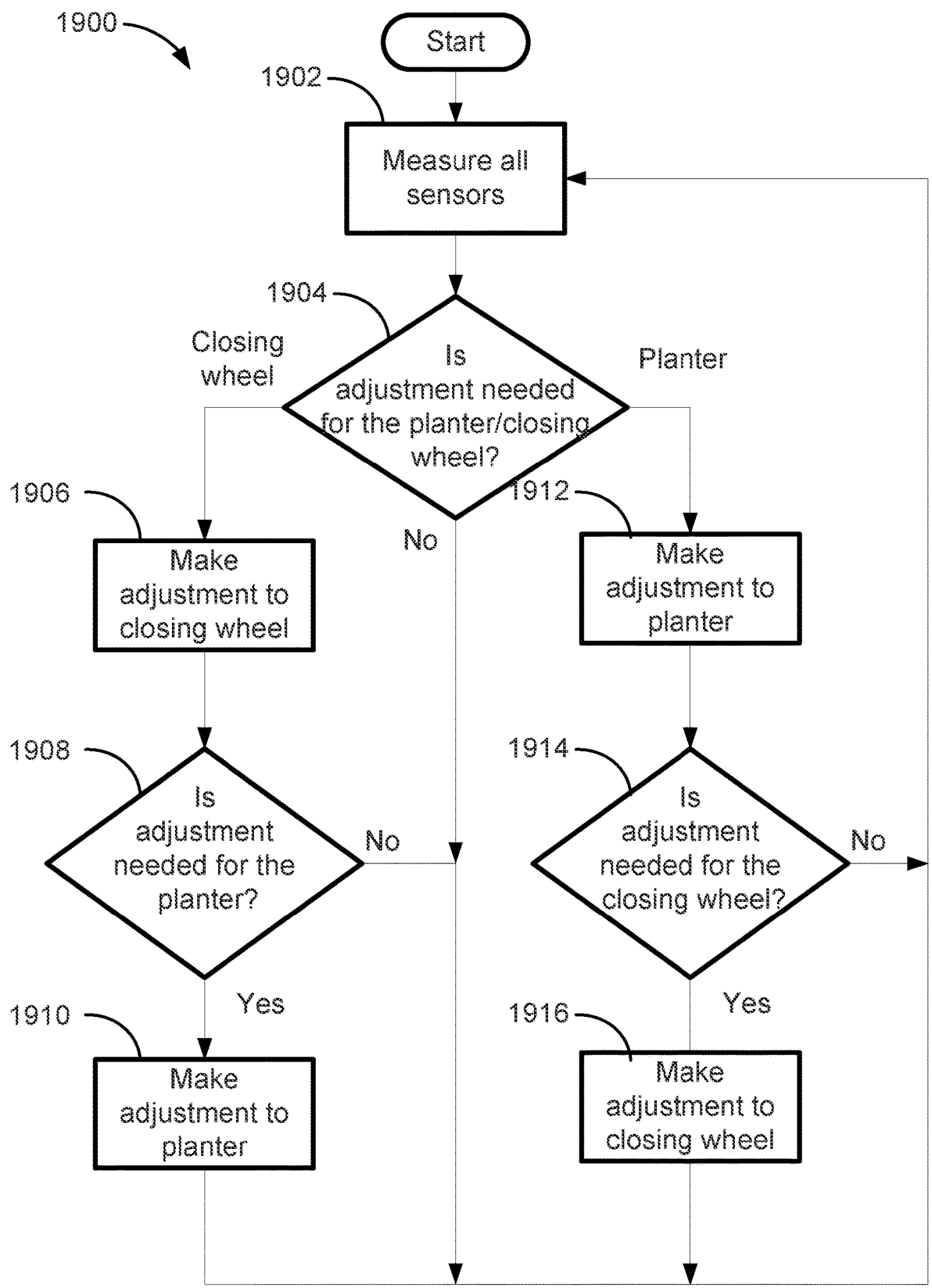
FIG. 19 is a flow chart of an algorithm used in the microprocessor in the control system illustrated in FIG. 18.
Figure 20:
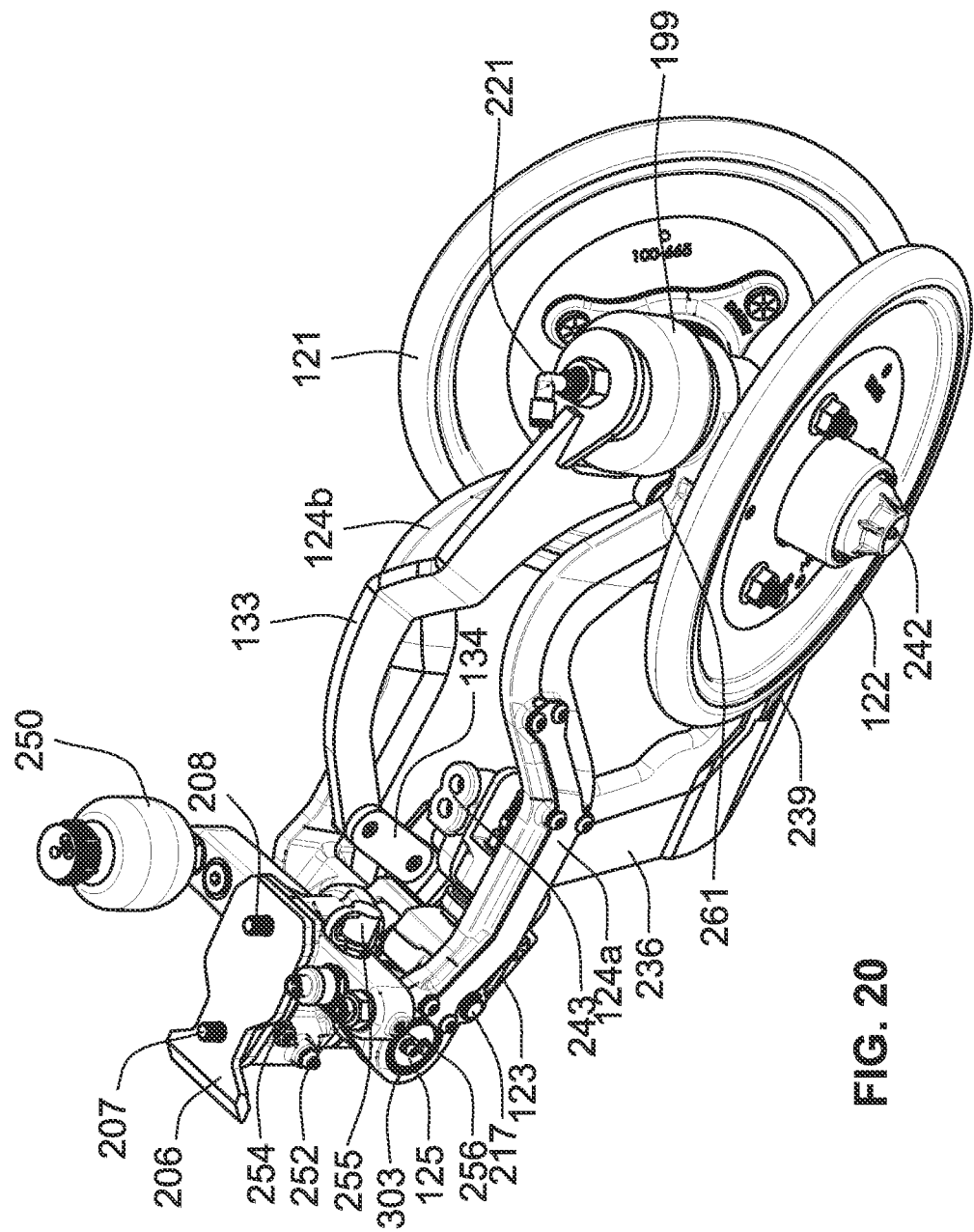
FIG. 20 is a perspective view of a planter row unit showing two different types of firming devices (a wheel and a blade form factors), one of which can be installed ahead of the closing wheels to firm the soil in the furrow after seeds have been planted therein.

FIG. 19 illustrates a flow chart algorithm 1900 for making adjustments to a planter and/or a closing wheel, such as any of the closing wheels 21, 22, 120, 121 disclosed herein. The algorithm 1900 can be executed by, for example, any controller disclosed herein, including the controller 60. The algorithm 1900 begins by measuring all sensors (1902), such as the pressure sensors 254, 364, 366, 369, 372 and the rotation sensor 375 disclosed herein. The algorithm 1900 checks whether an adjustment is needed to the planter or a closing wheel (1904). If an adjustment is needed to a closing wheel, such as the closing wheel 21, 22, 120, 121, an adjustment to the closing wheel is made (1906), such as by causing the wheel to be moved up or down by adjusting a downward force applied to it. In case an adjustment to the planter is also called for (1908), the algorithm 1900 checks whether an adjustment is needed to the planter, and if so, the adjustment is made (1910). If the algorithm determines at step 1904 that an adjustment is needed to the planter, an adjustment is made to the planter (1912), and the algorithm 1900 checks whether an adjustment is needed to a closing wheel (1914), and if so, the adjustment is made (1916).

According to aspects of the present disclosure, a sensor measures the compaction or density of the soil, whose output can be provided to a machine learning system to detect the soil type that the planter is in and automatically then change the planter row unit setpoint parameters (e.g., seed depth, row cleaner depth or force, down pressure gauge wheel load target, and closing wheel pressure or depth) based on the changing soil type. The algorithm increases the gauge wheel load target when the furrow hardness sensor is low and decreases it when it is high. There are preset upper and lower limits that the system will not pass out of so it has a built-in failsafe. The closing wheel depth or pressure setpoint can be changed at the same time (simultaneously). When the sensor value is high, the target closing wheel setting should move the closing wheel closer to the bottom of the furrow, and when the sensor value is low the target closing wheel setting should move the closing wheel just slightly higher. The machine learning system acquires data over some time period to establish or adjust the maximum and minimum in the data value of that time, compare it to other data from known samples, and make an inference about the soil type.

The furrow hardness is typically measured higher in clay and lower in sand. The soil type can be detected or inferred using a soil type using furrow hardness.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of passing a pressurized fluid through at least one internal channel formed inside a firming device as the firming device is moved along a furrow by an agricultural row unit, the method comprising:
    causing the pressurized fluid to be passed through the at least one internal channel of the firming device as the firming device is moved along the furrow until the pressurized fluid exits an opening in a soil-engaging portion of the firming device to dislodge an accumulation of mud or dirt thereon.

2. The method of claim 1, further comprising causing a second pressurized fluid to be passed through a separate internal channel of the firming device until it exits a separate opening in the firming device.

3. The method of claim 2, wherein the second pressurized fluid is a fertilizer or a weed killer.

4. The method of claim 2, wherein the separate opening is positioned in soil of or surrounding the furrow to inject the second pressurized fluid into the soil during movement of the agricultural row unit relative to the furrow.

5. The method of claim 1, wherein the pressurized fluid is air.

6. The method of claim 5, further comprising sensing a pressure in the at least one internal channel to determine an increase in the pressure, and, responsive thereto, instructing a controller to cause a burst or blast of the pressurized air to exit the opening and thereby dislodge mud or dirt accumulated in a front area of the firming device as the agricultural row unit is moved along the furrow.

7. The method of claim 6, wherein the opening is arranged on a side of the firming device to dislodge mud or dirt that has accumulated on the side thereof.

8. The method of claim 6, further comprising causing a second pressurized fluid to be passed through a separate internal channel of the firming device until it exits a separate opening in the firming device, wherein the second pressurized fluid is a fertilizer or a weed killer.

9. The method of claim 6, wherein the opening is arranged on a front of the firming device to dislodge mud or dirt that has accumulated on the front thereof.

10. The method of claim 1, wherein the firming device is a wheel or includes a blade having a finger portion that engages soil of the furrow.

11. The method of claim 1, further comprising manufacturing the firming device according to an additive manufacturing process that forms the at least one internal channel in the firming device as it is being constructed.

12. The method of claim 11, wherein the additive manufacturing process includes a 3D printing process.

13. The method of claim 1, further comprising causing the firming device to move up or down relative to the furrow independent of an up or down movement of one or more closing wheels coupled to the same agricultural row unit as the firming device.

14. The method of claim 1, wherein the at least one channel follows a circuitous or non-straight path inside the firming device.

15. The method of claim 14, further comprising causing a second pressurized fluid to be passed through a second internal channel that is separate from the at least one internal channel of the firming device until it exits a separate opening of the firming device.

16. The method of claim 15, wherein the causing the pressurized fluid and the causing the second pressurized fluid are controlled by a controller that causes a first valve to open to cause the pressurized fluid to pass through the at least one internal channel of the firming device and/or a second valve to open to cause the second pressurized fluid to pass through the second internal channel of the firming device, the first and second pressurized fluids originating from a common source until separated by the at least one internal channel and the second internal channel.

17. The method of claim 16, wherein the pressurized fluid is air.

18. The method of claim 17, further comprising sensing a pressure in the at least one internal channel to determine an increase in the pressure, and, responsive thereto, instructing the controller or another controller to cause a burst or blast of the pressurized air to exit the opening and thereby dislodge mud or dirt accumulated in a front area of the firming device as the agricultural row unit is moved along the furrow.

19. The method of claim 1, wherein the causing is controlled by a controller that causes a valve to open to cause the pressurized fluid to pass through the at least one internal channel of the firming device.

20. The method of claim 1, further comprising, responsive to the causing, measuring a compaction or density of soil in the furrow by an algorithm executed by a controller and whose output is provided to a machine learning system to automatically change setpoint parameters of the agricultural row unit.

21. An agricultural planter having the firming device and configured to carry out the method of claim 1.

* * * * *